US012724927B2

(12) United States Patent
Banerjee et al.

(10) Patent No.: US 12,724,927 B2
(45) Date of Patent: Sep. 1, 2026

(54) ENHANCED BLOCKCHAIN DATA COMPUTING PLATFORM FOR STRATEGIC MASTER DATA MANAGEMENT

(71) Applicant: Truist Bank, Charlotte, NC (US)

(72) Inventors: Lekha A. Banerjee, Charlotte, NC (US); Thomas S. Dickson, Overland Park, KS (US); Randhir Bhan, Sharon, MA (US); Srinivasan Ramanujam, Charlotte, NC (US)

(73) Assignee: TRUIST BANK, Charlotte, NC (US)

( * ) Notice: Subject to any disclaimer, the term of this patent is extended or adjusted under 35 U.S.C. 154(b) by 669 days.

(21) Appl. No.: 18/170,613

(22) Filed: Feb. 17, 2023

(65) Prior Publication Data

US 2024/0265002 A1 Aug. 8, 2024

Related U.S. Application Data

(60) Provisional application No. 63/482,869, filed on Feb. 2, 2023.

(51) Int. Cl.
*G06F 21/64* (2013.01)
*G06F 9/455* (2018.01)
(Continued)

(52) U.S. Cl.
CPC .......... *G06F 21/64* (2013.01); *G06F 9/45558* (2013.01); *G06F 9/54* (2013.01);
(Continued)

(58) Field of Classification Search
None
See application file for complete search history.

(56) References Cited

U.S. PATENT DOCUMENTS

| | | | |
|---|---|---|---|
| 10,361,866 | B1 | 7/2019 | Mcgregor |
| 11,188,977 | B2 | 11/2021 | Youb |

(Continued)

FOREIGN PATENT DOCUMENTS

| | | | |
|---|---|---|---|
| WO | 2019147295 | A1 | 8/2019 |
| WO | 2019193363 | A1 | 10/2019 |
| WO | 2024030665 | A2 | 2/2024 |

OTHER PUBLICATIONS

Huu Tran; A Trust based access Control Framework for P2P File-Sharing Systems; IEEE: Year: 2005: pp. 1-10.

(Continued)

*Primary Examiner* — Raquel Perez-Arroyo
*Assistant Examiner* — Jessica N Le
(74) *Attorney, Agent, or Firm* — Michael A. Springs, Esq.; Shumaker, Loop & Kendrick, LLP; Patrick B. Horne

(57) ABSTRACT

An enhanced blockchain data computing platform for strategic master data management provides a package-built solution using a blockchain platform for Master Data Management. Identity Management and Asset Management are constructed as coordinated extensions of inherent blockchain capabilities. Queries against a Master Data World State provide interactive views into the Data Assets and a full-provenance historical view of Data Asset transactions recorded in a Master Ledger. This ledger is then automatically shared as Distributed Ledger Copies across the blockchain network to other Network Node applications thereby providing access to the same Master Data and improving source data quality and MDM results over time as the Network Nodes synchronize on a single trusted Master Data Management Source of Record.

17 Claims, 23 Drawing Sheets

(51) Int. Cl.

| | |
|---|---|
| ***G06F 9/54*** | (2006.01) |
| ***G06F 16/21*** | (2019.01) |
| ***G06F 16/23*** | (2019.01) |
| ***G06F 16/901*** | (2019.01) |
| ***G06F 21/62*** | (2013.01) |
| ***G06Q 20/22*** | (2012.01) |
| ***G06Q 20/38*** | (2012.01) |
| ***G06Q 20/40*** | (2012.01) |
| ***H04L 9/00*** | (2022.01) |
| ***H04L 9/32*** | (2006.01) |
| ***H04L 9/40*** | (2022.01) |

(52) U.S. Cl.

CPC ............ *G06F 9/542* (2013.01); *G06F 16/219* (2019.01); *G06F 16/2379* (2019.01); *G06F 16/901* (2019.01); *G06F 21/6245* (2013.01); *G06Q 20/223* (2013.01); *G06Q 20/389* (2013.01); *G06Q 20/401* (2013.01); *H04L 9/3263* (2013.01); *H04L 9/40* (2022.05); *H04L 9/50* (2022.05); *H04L 63/0823* (2013.01); *H04L 63/0892* (2013.01); *H04L 63/101* (2013.01); *H04L 63/20* (2013.01); *G06F 2009/45595* (2013.01); *G06F 2209/549* (2013.01)

(56) References Cited

U.S. PATENT DOCUMENTS

| | | | | |
|---|---|---|---|---|
| 2018/0293573 | A1 | 10/2018 | Ortiz | |
| 2019/0102409 | A1 | 4/2019 | Shi | |
| 2019/0164220 | A1 | 5/2019 | Raj | |
| 2020/0118068 | A1* | 4/2020 | Turetsky | G06Q 10/0831 |
| 2020/0151167 | A1 | 5/2020 | Shi | |
| 2020/0153607 | A1 | 5/2020 | Shi | |
| 2020/0218815 | A1 | 7/2020 | Haque | |
| 2020/0344233 | A1* | 10/2020 | Lai | G06Q 20/4014 |
| 2020/0371755 | A1* | 11/2020 | Patni | G06F 8/34 |
| 2020/0374106 | A1 | 11/2020 | Padmanabhan | |
| 2021/0014065 | A1 | 1/2021 | Gourisetti | |
| 2021/0073913 | A1 | 3/2021 | Ingargiola | |
| 2021/0075870 | A1* | 3/2021 | Kempf | G06F 9/5005 |
| 2021/0226774 | A1 | 7/2021 | Padmanabhan | |
| 2021/0264419 | A1 | 8/2021 | Ratakonda | |
| 2021/0273920 | A1* | 9/2021 | Deriso | H04L 9/3268 |
| 2022/0012367 | A1* | 1/2022 | Ramanan | G06F 8/41 |
| 2022/0067669 | A1* | 3/2022 | Griffin | G16Y 40/20 |
| 2022/0095079 | A1 | 3/2022 | Volkerink | |
| 2022/0109956 | A1 | 4/2022 | Volkerink | |
| 2022/0201047 | A1 | 6/2022 | Manamohan | |
| 2022/0327521 | A1* | 10/2022 | Thomsen | G06Q 20/401 |
| 2022/0335423 | A1 | 10/2022 | Ma | |
| 2023/0069247 | A1* | 3/2023 | Kucherov | G06F 16/955 |
| 2023/0092365 | A1* | 3/2023 | Ricotta | H04L 9/50 713/193 |
| 2023/0205761 | A1* | 6/2023 | Coker | G06F 16/278 707/703 |
| 2023/0396445 | A1* | 12/2023 | Padmanabhan | H04L 9/50 |
| 2024/0223390 | A1 | 7/2024 | Wang | |
| 2024/0264856 | A1 | 8/2024 | Banerjee | |
| 2024/0265002 | A1 | 8/2024 | Banerjee | |
| 2024/0265003 | A1 | 8/2024 | Banerjee | |

OTHER PUBLICATIONS

Marar, Hazem W., and Rosana W. Marar. "Hybrid blockchain." Jordanian Journal of Computers and Information Technology (JJCIT) 6.04, 2020. (Year: 2020).

Y.-C. Hsieh, C.-W. Hsueh and J.-L. Wu, "The Exchange Center: A Case Study of Hybrid Decentralized and Centralized Applications in Blockchain," 2018 1st IEEE International Conference on Hot Information—Centric Networking (HotICN), Shenzhen, China, 2018, pp. 232-233. (Year: 2018).

Javeri, P. (Jan. 13, 2019). Blockchain Architecture. Medium. https://medium.com/@prashunjaveri/blockchain-architecture-3f9f1 c6dac5e. (Year: 2019).

Hyperledger. (Jun. 16, 2021). Hyperledger Fabric Docs Documentation (Release 2.1) [PDF]. https://hyperledger-fabric.readthedocs.io/ (Year: 2021).

* cited by examiner

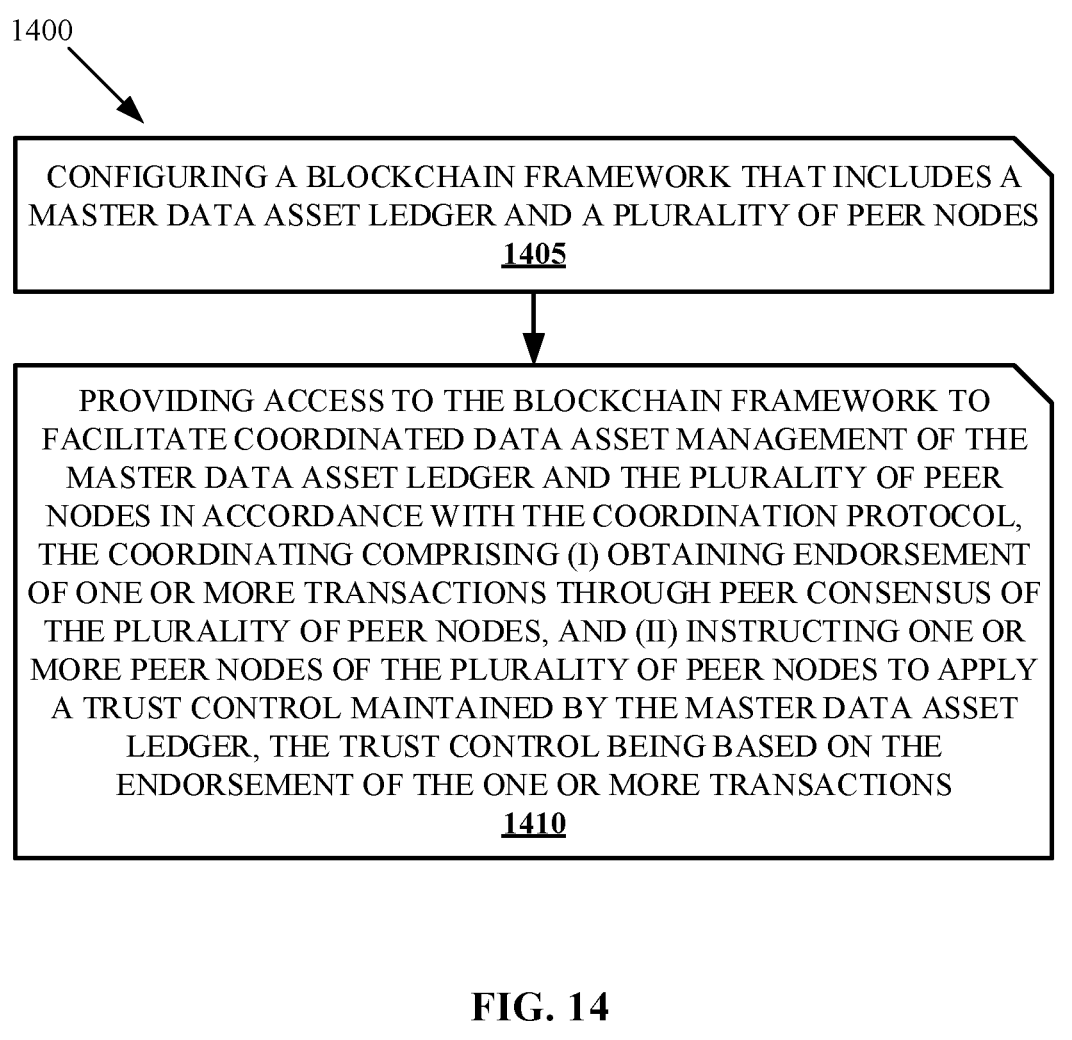

1400

CONFIGURING A BLOCKCHAIN FRAMEWORK THAT INCLUDES A MASTER DATA ASSET LEDGER AND A PLURALITY OF PEER NODES
1405

PROVIDING ACCESS TO THE BLOCKCHAIN FRAMEWORK TO FACILITATE COORDINATED DATA ASSET MANAGEMENT OF THE MASTER DATA ASSET LEDGER AND THE PLURALITY OF PEER NODES IN ACCORDANCE WITH THE COORDINATION PROTOCOL, THE COORDINATING COMPRISING (I) OBTAINING ENDORSEMENT OF ONE OR MORE TRANSACTIONS THROUGH PEER CONSENSUS OF THE PLURALITY OF PEER NODES, AND (II) INSTRUCTING ONE OR MORE PEER NODES OF THE PLURALITY OF PEER NODES TO APPLY A TRUST CONTROL MAINTAINED BY THE MASTER DATA ASSET LEDGER, THE TRUST CONTROL BEING BASED ON THE ENDORSEMENT OF THE ONE OR MORE TRANSACTIONS
1410

FIG. 14

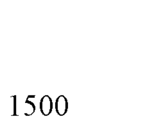

CONFIGURING A COMPUTING NETWORK COMPRISING A BLOCKCHAIN FRAMEWORK, WHEREIN THE BLOCKCHAIN FRAMEWORK COMPRISES A PLURALITY OF PEER NODES CONFIGURED TO COLLECTIVELY EXECUTE A SET OF TRUST PROTOCOLS TO ENDORSE DISPOSITION OF A TRANSACTION IN A MASTER LEDGER THAT IS CONFIGURED TO STORE DATA ASSET RECORDS OF DECENTRALIZED APPLICATIONS
1505

PROVIDING, TO ONE OR MORE COMPUTING DEVICES, ACCESS TO THE CONFIGURED PEER-TO-PEER COMPUTING NETWORK TO FACILITATE COORDINATED DATA ASSET MANAGEMENT VIA THE BLOCKCHAIN FRAMEWORK
1510

FIG. 15

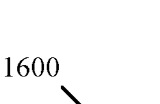

CALLING, VIA A USER DEVICE, A PORTION OF AN APPLICATION PROGRAMMING INTERFACE (API) TO ACCESS A PORTION OF A CURRENT STATE DATA SERVER OF THE BLOCKCHAIN COMPUTING PLATFORM CONFIGURED TO PERFORM VIRTUAL MACHINE PROCESSING, THE BLOCKCHAIN COMPUTING PLATFORM COMPRISING A PLURALITY OF INTERCONNECTED DATA PROCESSING NODES, THE DATA PROCESSING NODES COMPRISING:A MASTER LEDGER CONFIGURED TO STORE DATA ASSET RECORDS FOR MASTER DATA RECEIVED FROM DECENTRALIZED APPLICATION TRANSACTIONS PERFORMED VIA THE PLURALITY OF INTERCONNECTED DATA PROCESSING NODES, AND A PLURALITY OF PEER NODES CONFIGURED TO PROVIDE CRYPTOGRAPHIC ALGORITHMIC TRUST CONTROL FOR MASTER DATA MANAGEMENT OF THE MASTER DATA
1605

RECEIVING, FROM THE CURRENT STATE SERVER, AND DISPLAYING, VIA A USER INTERFACE OF THE USER DEVICE, CURRENT STATE RESULTS OF THE ONE OR MORE CERTIFIED TRANSACTIONS
1610

FIG. 16

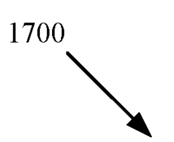

ESTABLISHING A PLURALITY OF PROCESSING NODES, THE PROCESSING NODES COMPRISING: AN IMMUTABLE MASTER LEDGER COMPRISING DATA ASSET RECORDS FOR MASTER DATA, AN OPERATIONAL WORLD STATE DATA SERVER WITH CURRENT STATE DATA, AND AN APPLICATION PROGRAMMING INTERFACE CONFIGURED TO PROVIDE ACCESS TO DATA, AND CONSTRUCT AND DEPLOY A CUSTOM USER INTERFACE
1705

MAINTAINING EXISTENCE OF THE PLURALITY OF PROCESSING NODES
1710

FIG. 17

ENHANCED BLOCKCHAIN DATA COMPUTING PLATFORM FOR STRATEGIC MASTER DATA MANAGEMENT

CROSS-REFERENCE TO RELATED APPLICATIONS

This application claims priority benefit of U.S. Provisional Patent Application No. 63/482,869, filed on Feb. 2, 2023 and entitled An Enhanced Blockchain Data Computing Platform For Strategic Master Data Management, the entire contents of which is hereby expressly incorporated herein by reference in its entirety.

FIELD

This invention is related generally to the field of data management, and more particularly embodiments of the invention relate to master data management using blockchain.

BACKGROUND OF THE INVENTION

Master Data Management (MDM) is the concept of creating a single master record to ensure that data is coordinated across a business. MDM technology is intended to create a trusted an authoritative view of the business's data and has taken on greater importance as businesses make data-driven decisions. In general, MDM technology incorporates data integration and governance across systems to create a master record of data. The master record of data includes the essential data relied upon by the business such as, for example, customer data, location data, product data, supplier data, etc. that are essential for the operation of a business. MDM technology performs data cleansing, transformation, and integration of data to satisfy data quality thresholds, schemes and taxonomies in order to maintain accurate and consistent data. Advantageously MDM technology can eliminate redundancies that arise when businesses rely on multiple, conflicting sources for information.

Today's off-the-shelf MDM packages provide solid technical capabilities for a "build your own" MDM solution. Capabilities for managing IDs, search, match & merge, and business rules are sufficient for developing and deploying a custom solution. What these off-the-shelf MDM packages fail to provide, however, is a way to manage "poor" source data quality-specifically as it affects the content and integrity of MDM results on master data. Additionally, existing MDM packages may store and forward redundant copies, data misrepresentations, and data discrepancies, which can also negatively affect the data quality of the master data. Thus, a need exists to improve MDM technology in order to provide better source data quality and reporting in order to improve the integrity of the master data and enable businesses to have more trust in the master data as a single source of truth for critical business data.

BRIEF SUMMARY

Embodiments of the present invention address the above needs and/or achieve other advantages by providing apparatuses and methods that for strategic master data management (MDM) using an enhanced blockchain data computing platform. Embodiments disclosed herein provide an enhanced blockchain data computing platform for strategic master data management, the Strategic Master Data Management—Blockchain Computing Platform, also known as the Strategic Master Data Platform or simply "MDM on Blockchain", is a networked IT platform for collective virtual machine processing and aggregate virtual computing results in Master Data. In particular, embodiments of the present invention, in various forms satisfy the need for a package-built solution by using a blockchain platform solution for its MDM foundation. In particular, MDM on Blockchain provides a new set of practices, procedures, methods and rules that can be used to manage master data in a more effective and efficient way by using a partially-decentralized, federated data source that takes the form of a Data Asset Ledger. Inherent blockchain capabilities provide advantages for identity management by providing auditable traceable and verifiable identification and can also provide advantages for asset management by, for example, providing consensus-based updates to asset records that can minimize disputes and improve discrepancies in data.

Specifically, MDM on Blockchain comprises an enhanced blockchain data computing platform for strategic MDM that leverages collective virtual machine processing and aggregate virtual computing to manage master data using a Master Ledger. The Master Ledger maintains the "world state" (i.e., a database that holds current values of a set of ledger states) and is a coordinated, replicated, shared and synchronized Data Asset Ledger that comprises block records on a chain listing and that evolves over time through a set of state transition events that are stored as the block records on the chain listing.

Queries against a Master Ledger or "Master Data World State" provide interactive views into the Data Assets along with a full-provenance historical view of all Data Asset transactions recorded in a Master Ledger. The Data Assets of the Master Ledger may also be shared as Distributed Ledger Copies across the blockchain network to other Network Node applications.

As a result, everyone on the Data Asset Network has access to the same Master Data of the Master Ledger. Both source data quality and MDM results are addressed and improved over time as the Network Nodes synchronize on a single trusted Master Data Management Source of Record.

In some embodiments, The Strategic Master Data Management—Blockchain Computing Platform of claim 1 is technically deployed as a peer-to-peer computing network comprising a plurality of interconnected data processing nodes (computing power), supporting one or more pods (processing environments), invoking one or more concurrent containers (application programs) as necessary to dynamically scale up to meet the technical performance requirements of the operational business need for MDM on Blockchain functionality, services, and data.

In some embodiments, the operational business need for MDM on Blockchain functionality, services, and data are satisfied through the established and maintained existence of processing nodes containing an immutable master ledger (or copy) with logs and history storing the data asset records for Master Data collected and/or derived from decentralized application transactions; an operational world state data server with (current state results) data actively available by query against the certified Master Data in the MDM Blockchain; an API for access to services and data as well as for the construction and deployment of a custom UI for MDM Blockchain Create, Retrieve, Update and Delete transaction functionality; and multiple coordinated Search capabilities to identify the provenance of data as well as its effective transactional progress (or history) and current world state in the MDM Blockchain.

According to some embodiments, the business functional processes of Master Data Registration and Certification are defined and managed using Distributed Ledger Technology provided by MDM on Blockchain, establishing the Strategic Master Data Management—Blockchain Computing Functions.

According to some embodiments, each of the plurality of interconnected processing nodes known as peer nodes contains a set of four functional layers including an access layer, a network layer, a service layer, and a data layer relative to its instantiated distributed ledger copy and operational world state data server.

According to some embodiments, at least one of the plurality of interconnected processing nodes is designated to be known as the master node contains additional functional responsibilities in set of four functional layers (including an access layer, a network layer, a service layer, and a data layer) relative to its instantiation of the master ledger and the primary operational world state data server.

According to some embodiments, each of the plurality of interconnected processing nodes known as peer nodes contains an MDM on Blockchain—Identity Management access layer responsible for: defining RBAC policies for access to services, and ABAC time-based rules for access to secure private data, and certain "sensitive" documents accepted and held with consent; maintaining an Authentication, Authorization, and Accounting (AAA) security framework that controls access to the distributed network of processing node resources, enforces policies, and audits usage; and using enterprise Active Directory user IDs and digital CA certificates for identification and the granting of access to the distributed network of processing node resources under policy.

According to some embodiments, each of the plurality of interconnected processing nodes known as peer nodes contains an MDM on Blockchain—Availability Management network layer responsible for: defining a distributed network processing node locations and network cluster locations with a local plurality of interconnected processing nodes; maintaining a DLT Distributed Ledger Technology data availability node network comprising a distributed ledger and a primary operational world state data server; using enterprise Message Queue (MQ) interfaces and Blockchain synchronized data for availability and localized access to the distributed network of processing node resources, with open and orchestrated communications across two levels of Trust Control channel messaging: (a) a decentralized control system comprising some or all of a plurality of the peer nodes, wherein the system relies on distributed control depending on work of lower-level components operating on local information, wherein each component of the system is equally responsible for contributing to a system objective by acting in the appropriate manner according to algorithmic trust controls (achieving Consensus); and (b) a centralized control system comprising some or all of a plurality of the peer nodes comprising a controller configured to instruct components either directly or through a hierarchy of entities, to instruct the next lower-level node according to authoritative trust controls, thereby providing supervision for network interactions between nodes to establish oversight for peer interactions and approval of endorsed transactions (applying Governance).

In some embodiments, each of the plurality of interconnected processing nodes known as peer nodes contains an MDM on Blockchain—Asset Management service layer responsible for: defining a "single view" of the data from authoritative sources, applying preprocessor standardization and normalization, and executing Registration and Certification processes; maintaining CRUD Create, Retrieve, Update and Delete MDM API framework comprising a distributed ledger and a primary operational world state data server set of services, wherein execution of these services are defined and controlled through Smart Contracts, with business rules collectively programmed to interoperate and support the processing of MDM transactions in response to occurrence of a predetermined event or events, implemented by: (a) "chain code" invoked by the decentralized control system to direct the processing in contributing to the programmed system objective (Master Data Management), first according to algorithmic trust controls (achieving Consensus) coordinating the work of peer nodes; and (b) second, according to the centralized control system comprising a controller configured to instruct components either directly or through a hierarchy of entities, to instruct the next lower-level node according to authoritative trust controls, thereby providing supervision for network interactions between nodes to establish oversight for (Master Data Management) standard peer interactions, resolution of non-consensus peer-to-peer interactions, and approval of endorsed MDM transactions (applying Governance); using an enterprise REST API engine and Blockchain query services to transfer (return) a representation of the requested data asset's state to the requesting distributed application (dApp), executed via Batch automation (enhanced to NRT) or Online Interactive (enhanced to RT).

In some embodiments, each of the plurality of interconnected processing nodes known as peer nodes contains an MDM on Blockchain—Storage Management data layer responsible for: defining a "single view" of the data as a Party Master, Account Master and Relationship Master authoritative sources, ensuring preprocessor standardization and normalization occur, and collecting the results of enhanced Master Data Registration and Certification processes; maintaining CRUD Create, Retrieve, Update and Delete MDM Master Data contained within the documented transactions of a distributed ledger, and a primary operational world state data server set of Master Data RESTful data assets stored as immutable blocks on Blockchain; using an enterprise grade Multi-Model database to store JSON format document files in establishing and controlling the Data Quality and Relational Integrity for those Core data assets, Extended and Super Extended data, and a coordinated History of Master Data transactions produced through the enhanced Blockchain distributed network of processing node resources. Master Data considered to be "In Motion," "In Processing" or "At Rest" would be protected by Blockchain cryptography and stored data encryption.

The features, functions, and advantages that have been discussed may be achieved independently in various embodiments of the present invention or may be combined in yet other embodiments, further details of which can be seen with reference to the following description and drawings.

BRIEF DESCRIPTION OF THE DRAWINGS

Figure 1A:
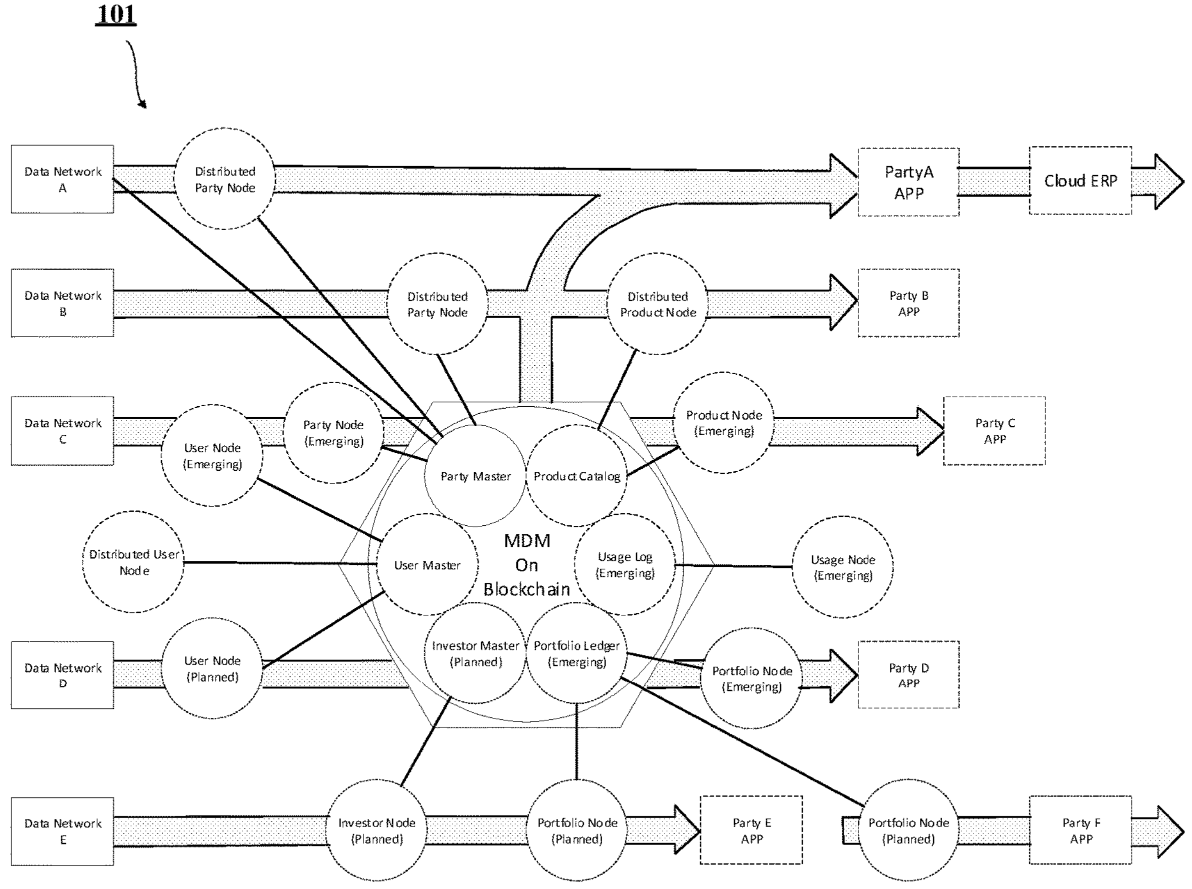
Figure 1B:
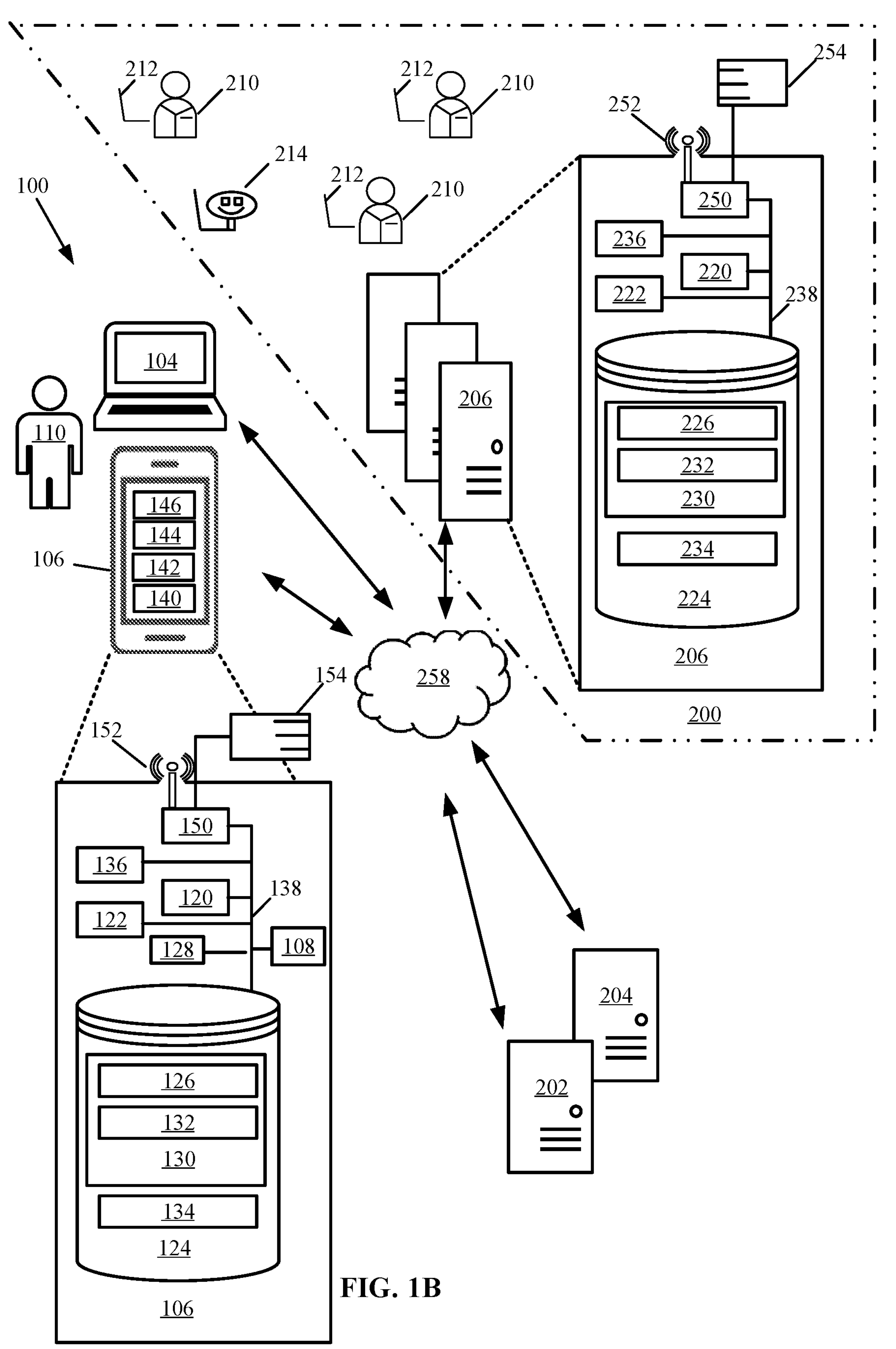
Figure 2:
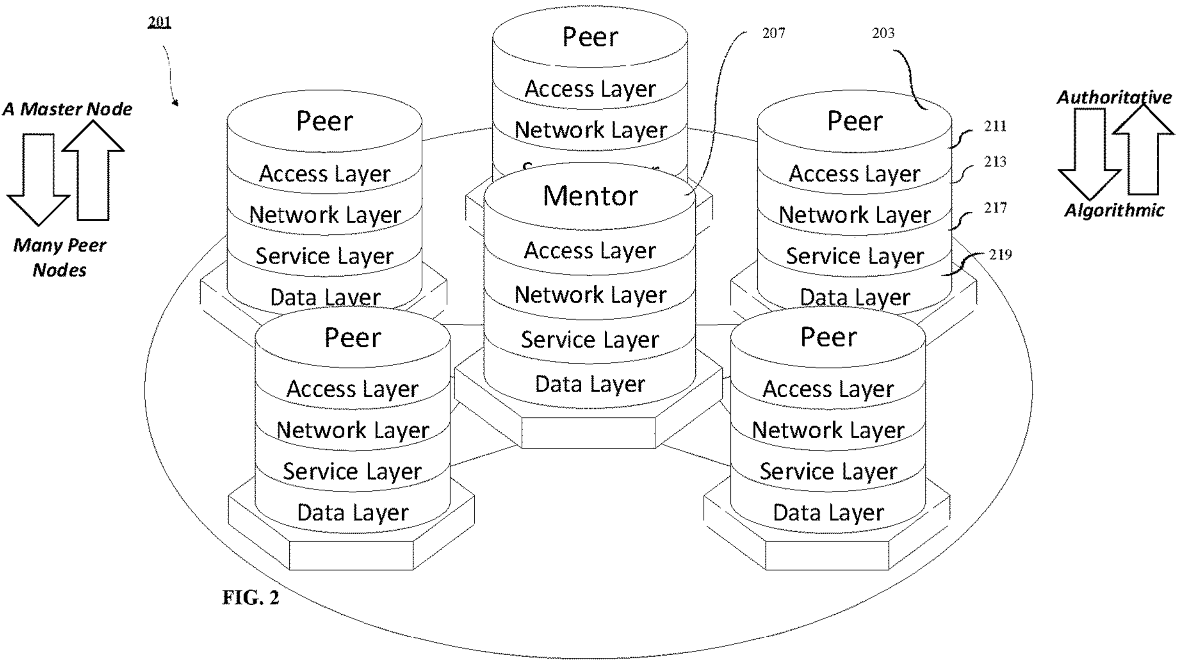
Figure 3:
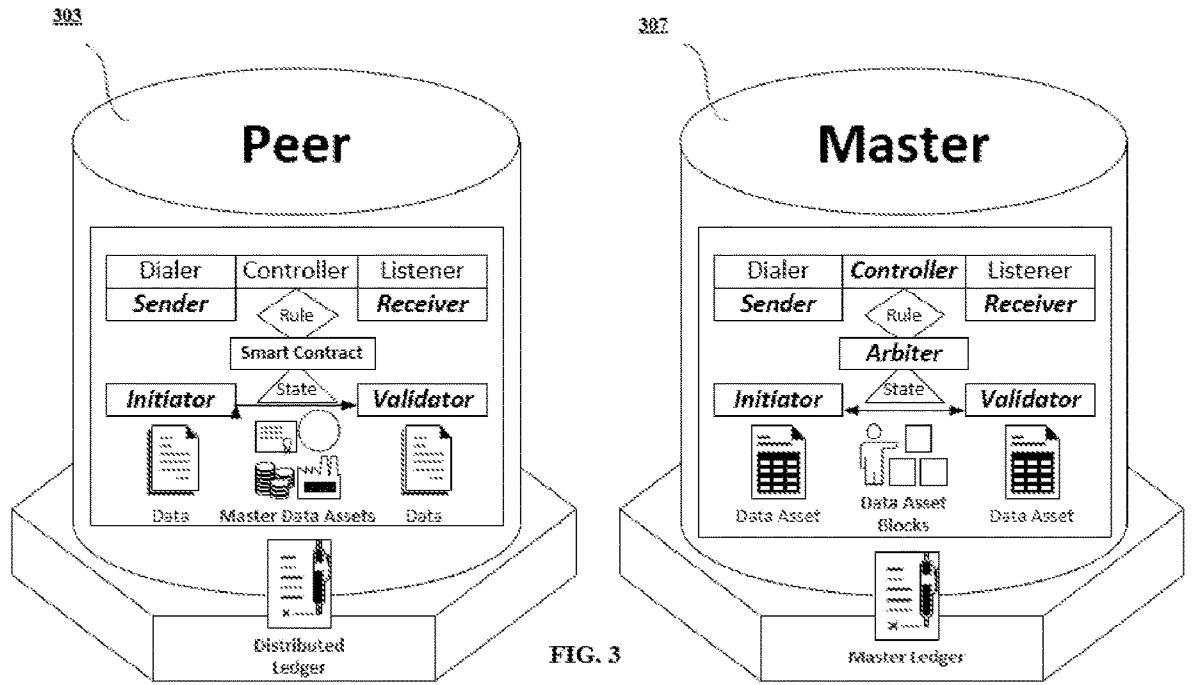
Figure 4A:
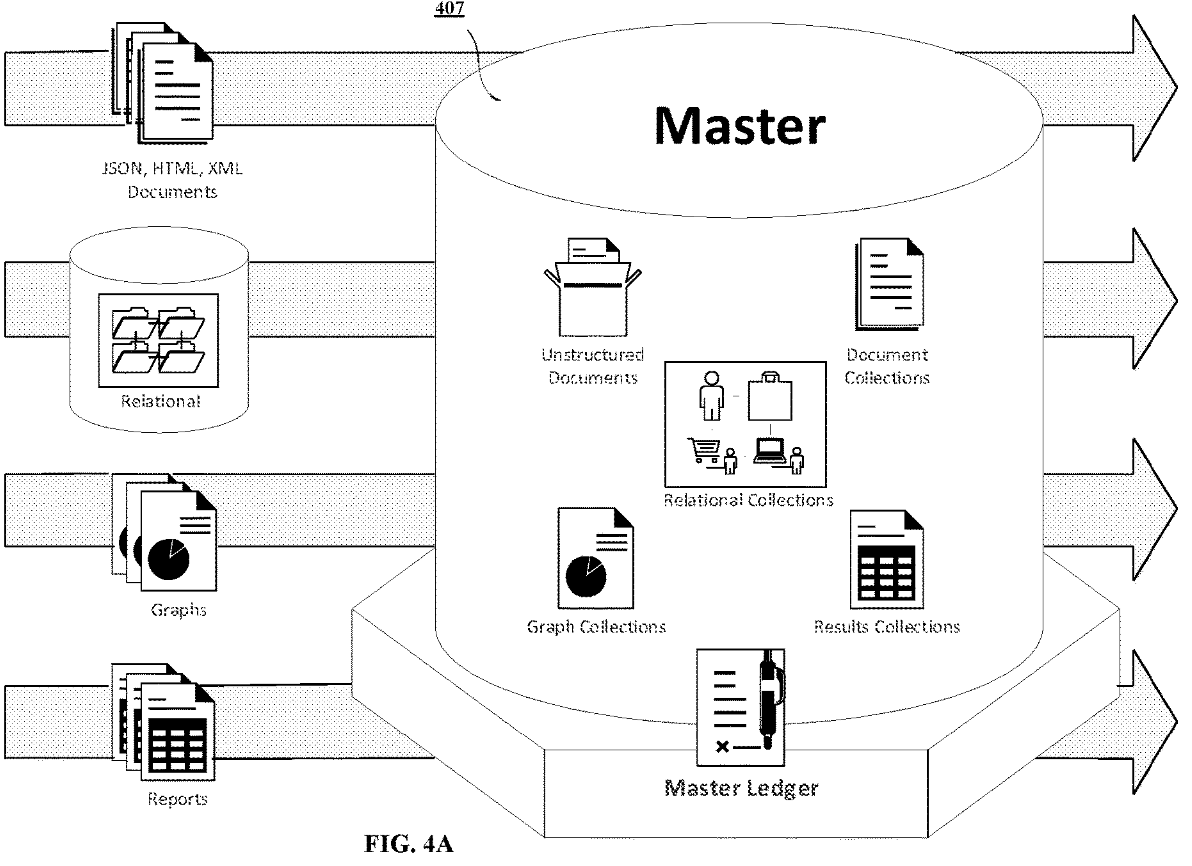
Figure 4B:
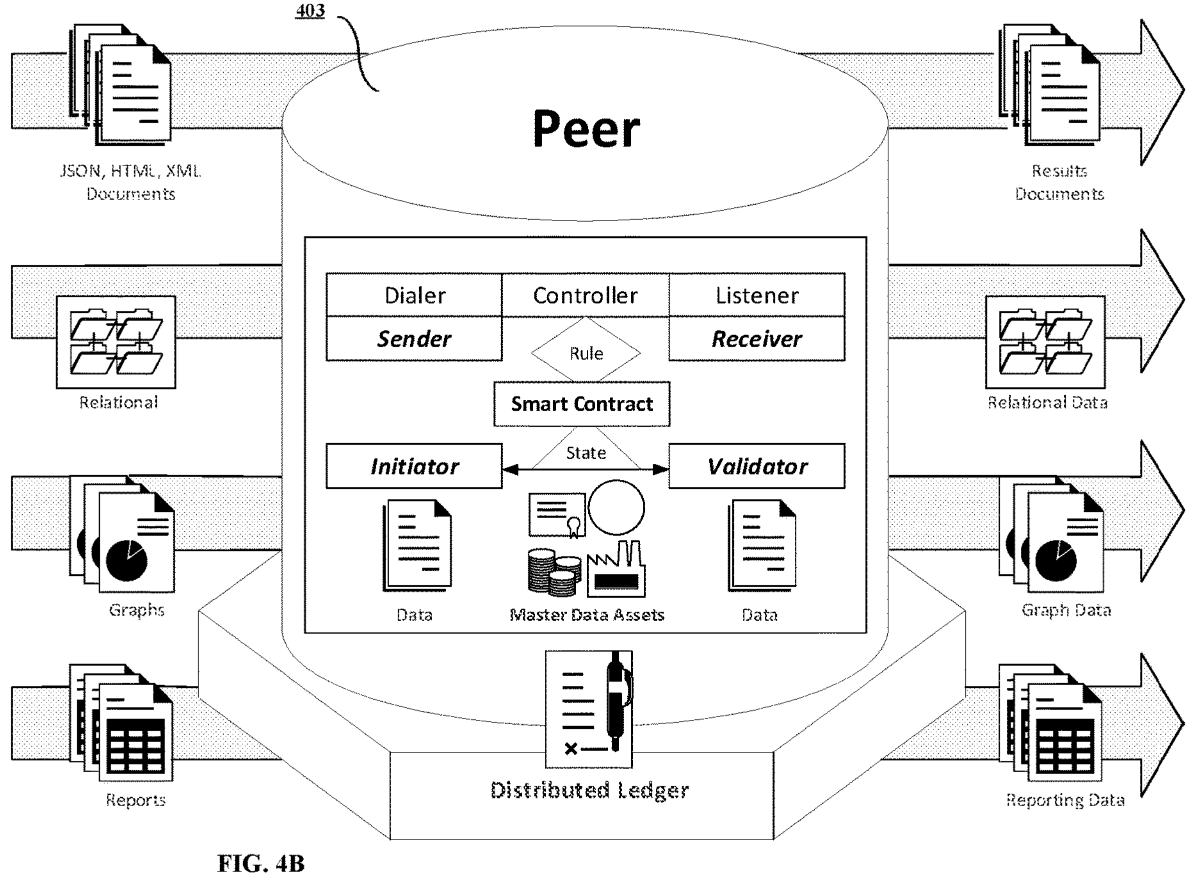
Figure 5:
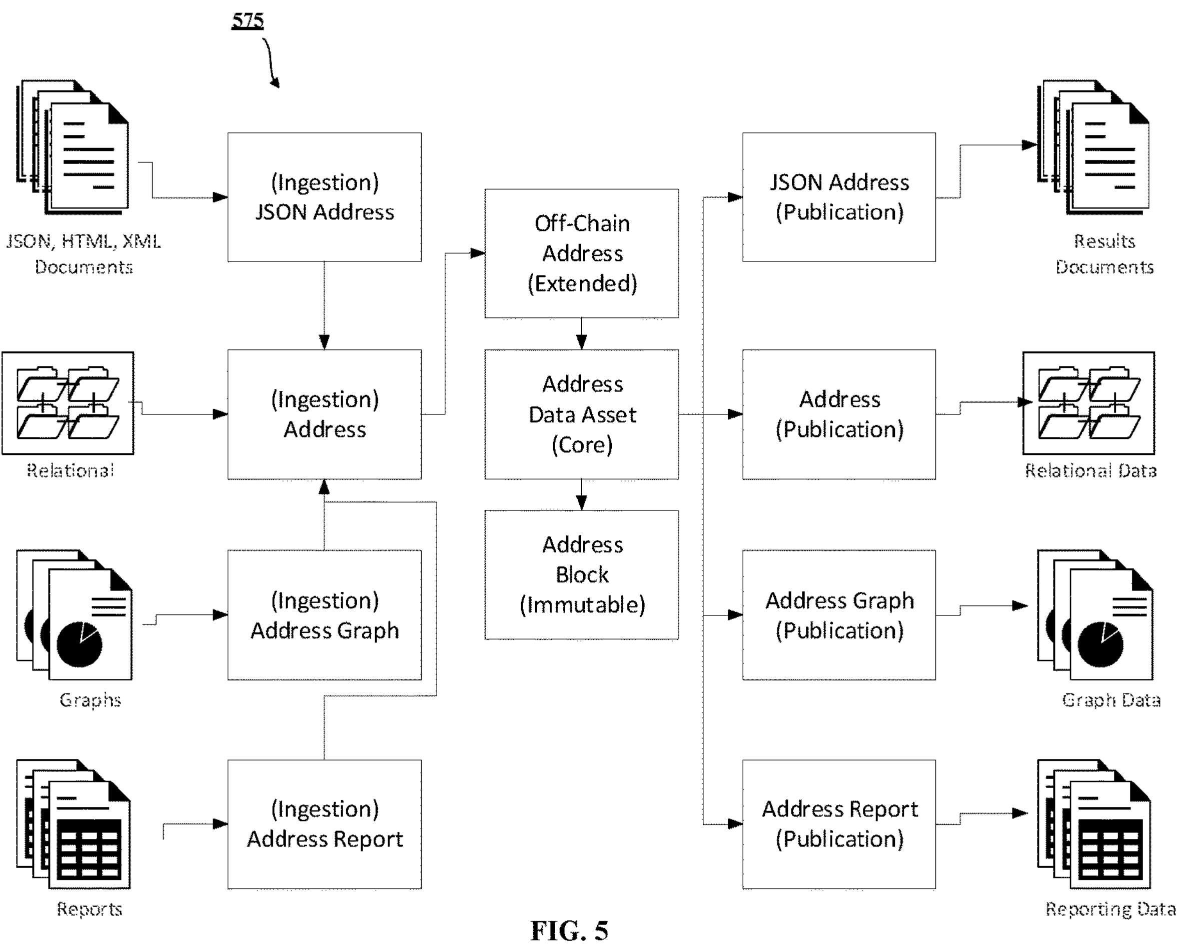
Figures 6A, 6B:
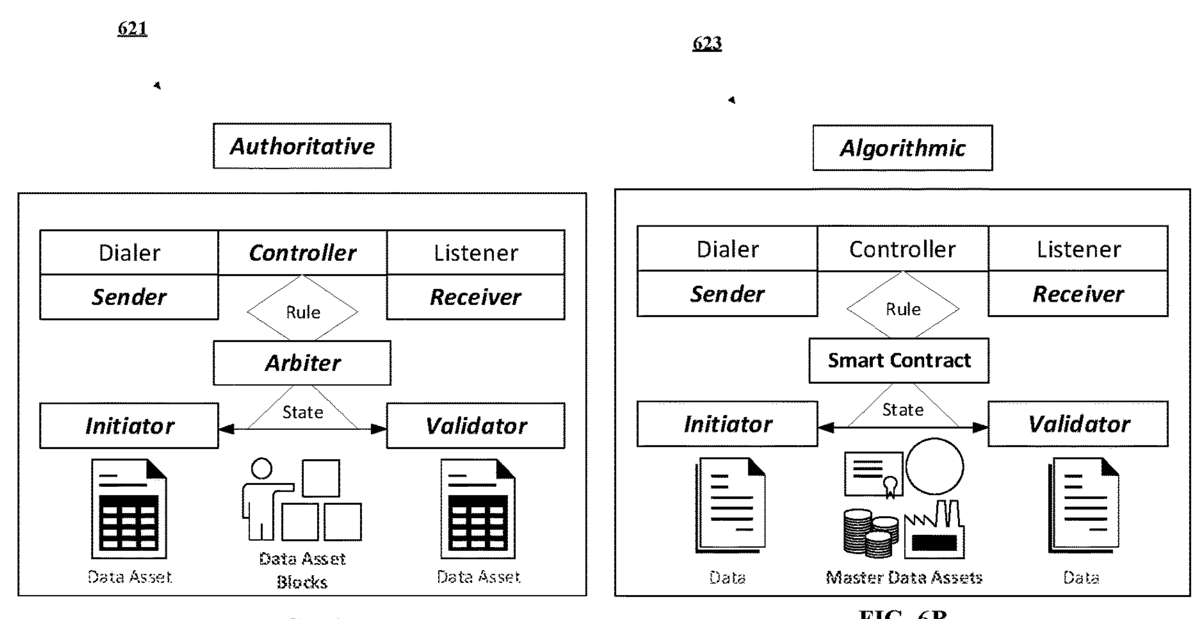
Figure 7:
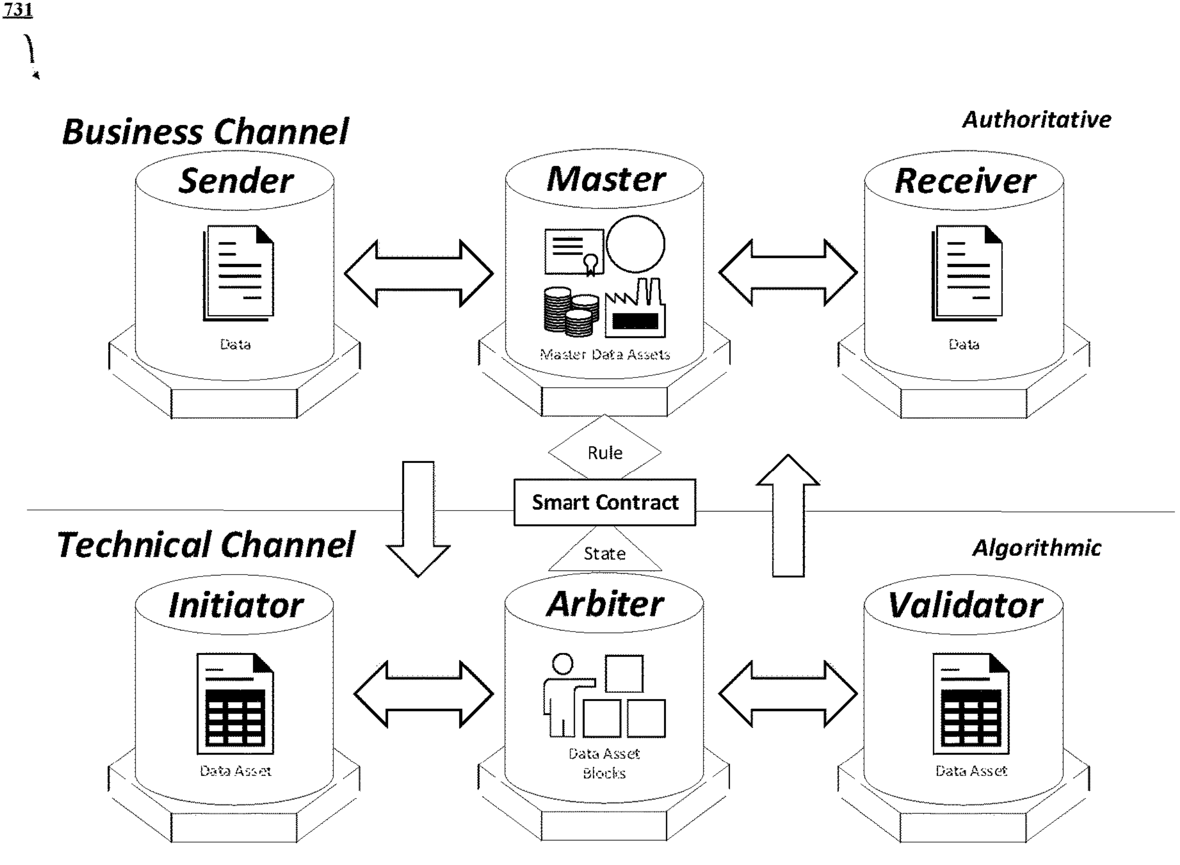
Figure 8:
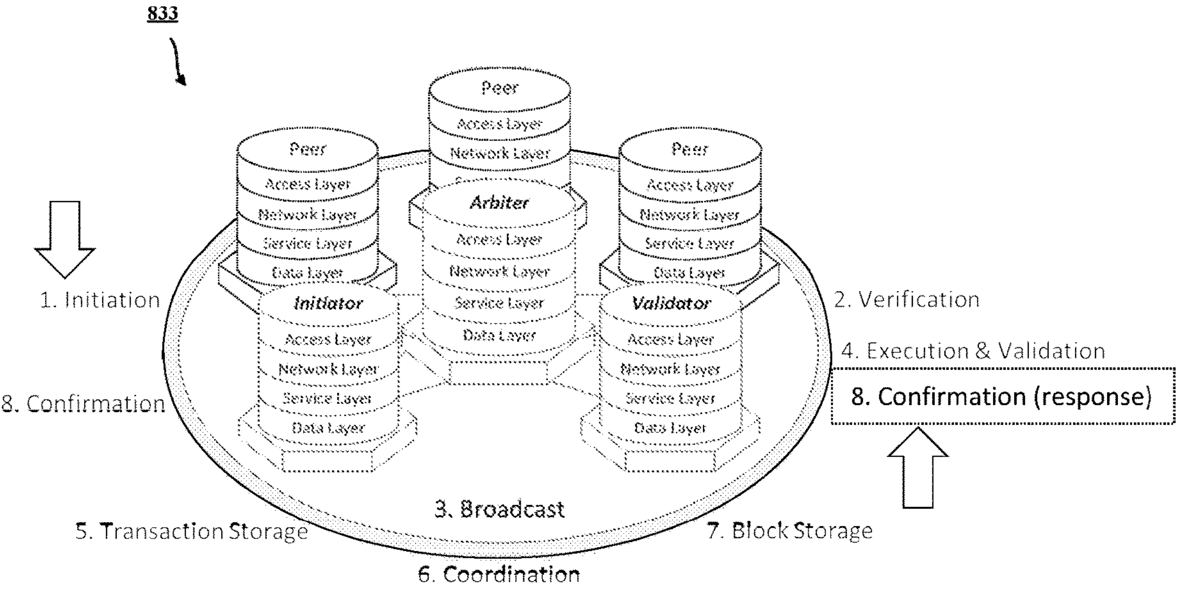
Figure 9:
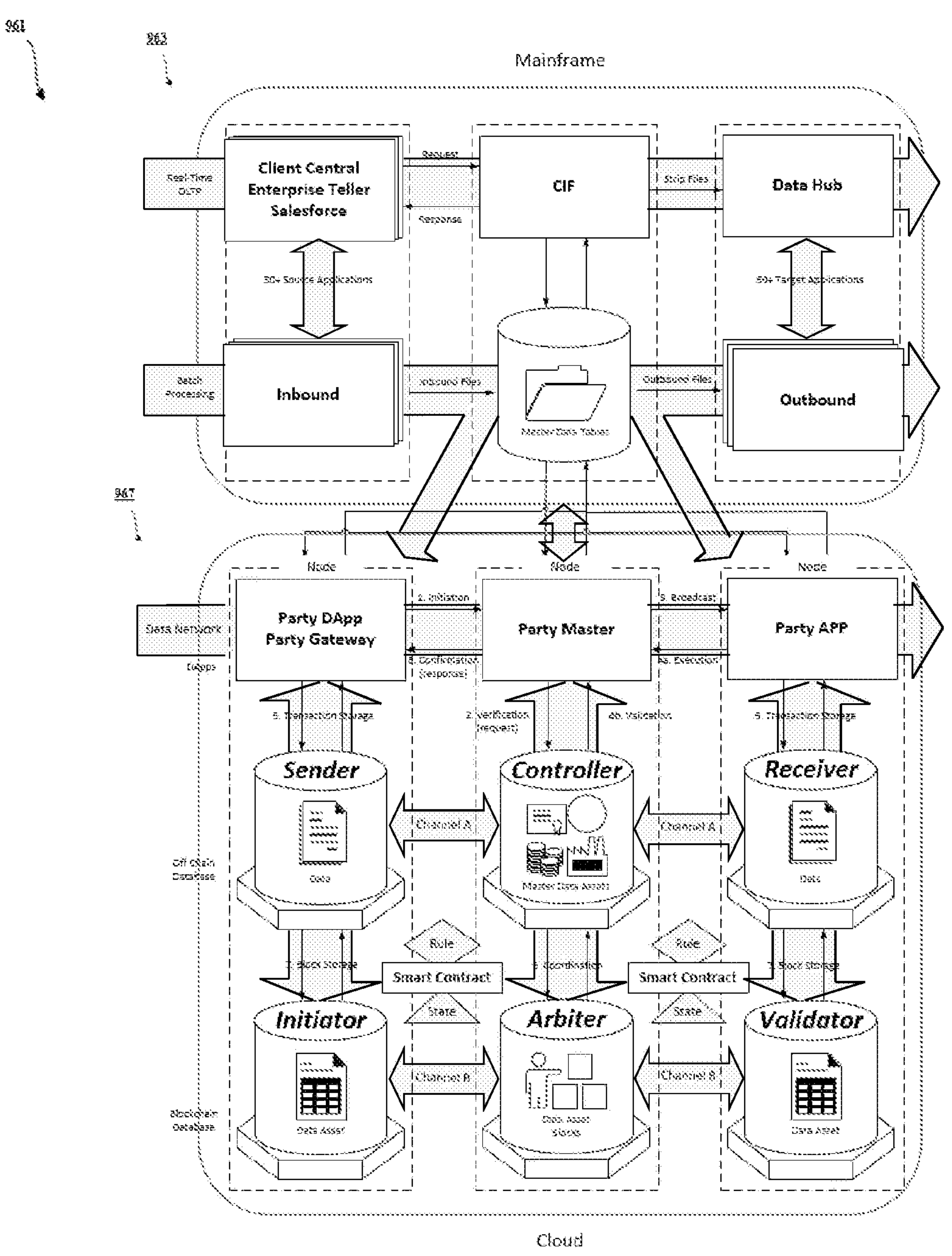
Figure 10:
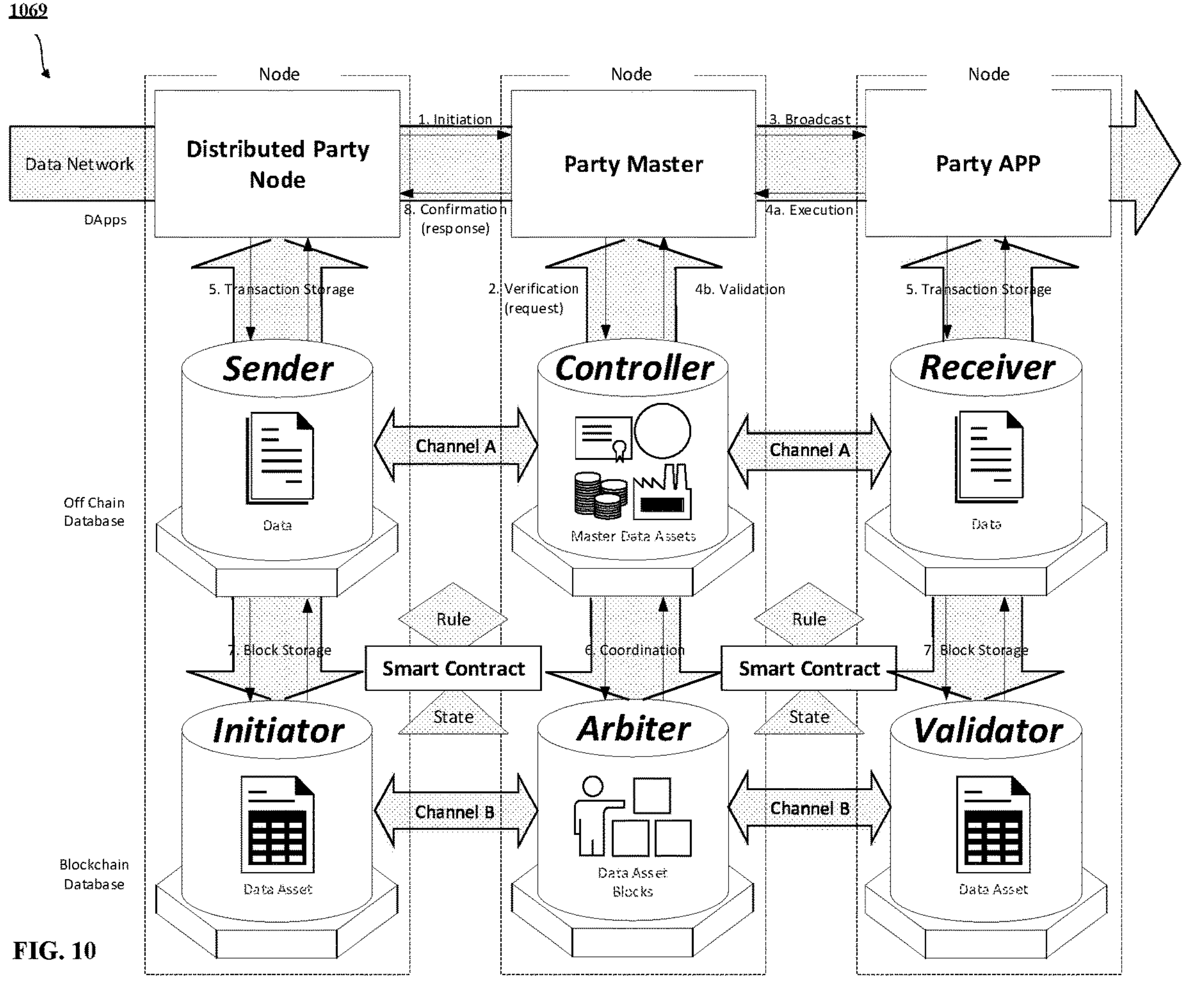
Figure 11:
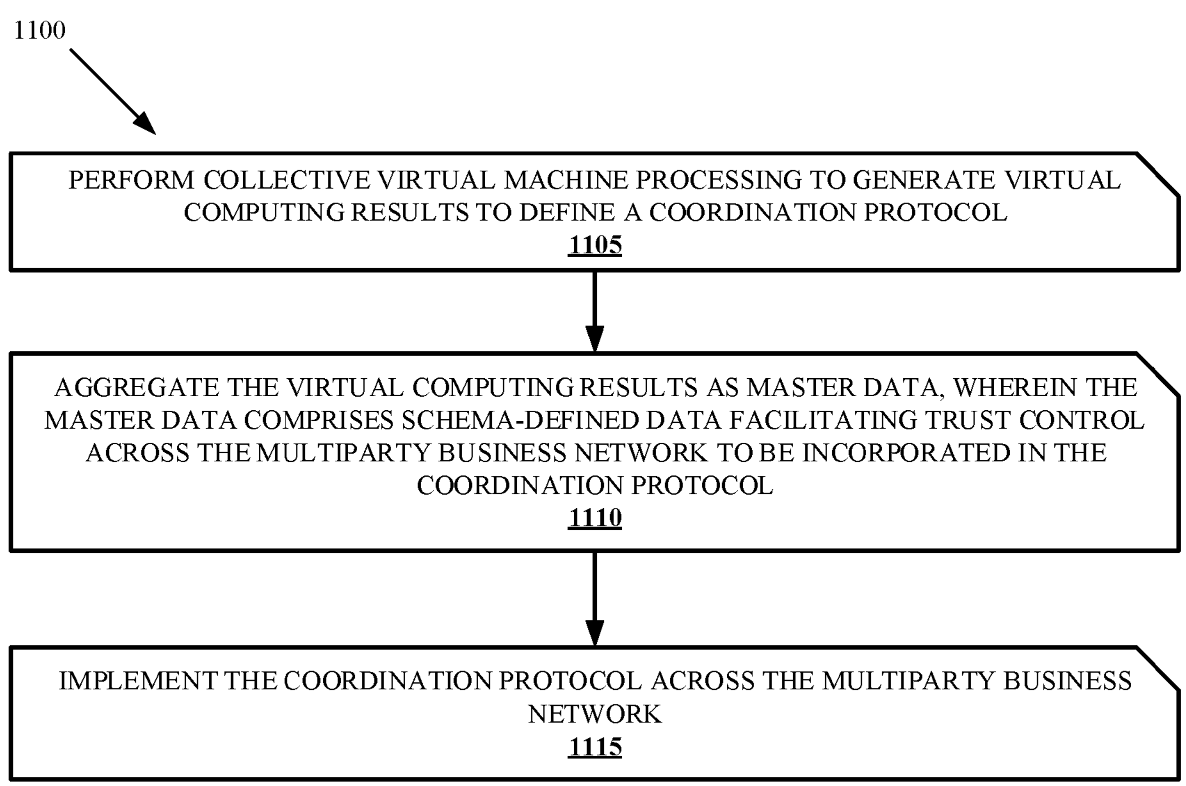
Figure 12:
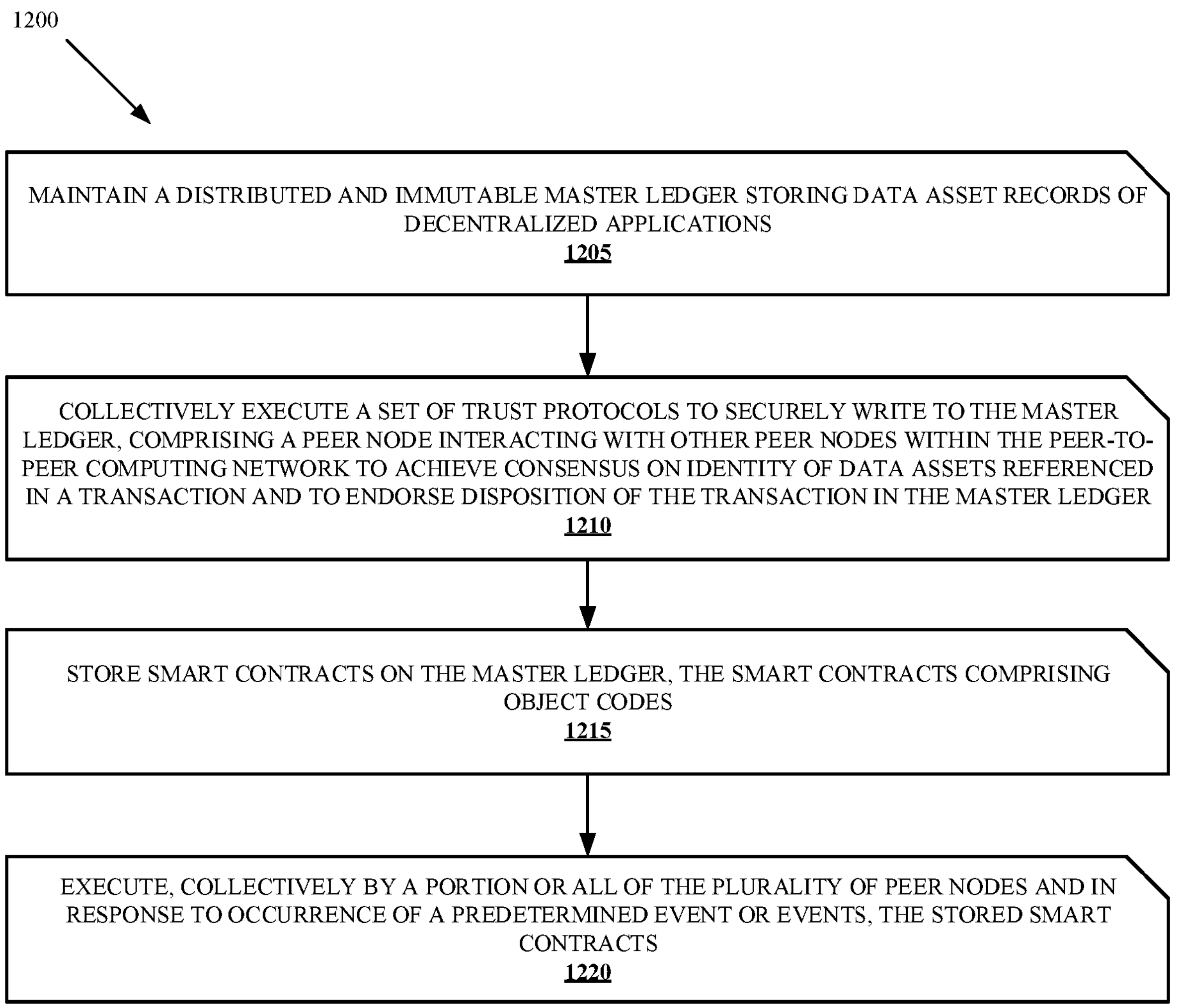
Figure 13:
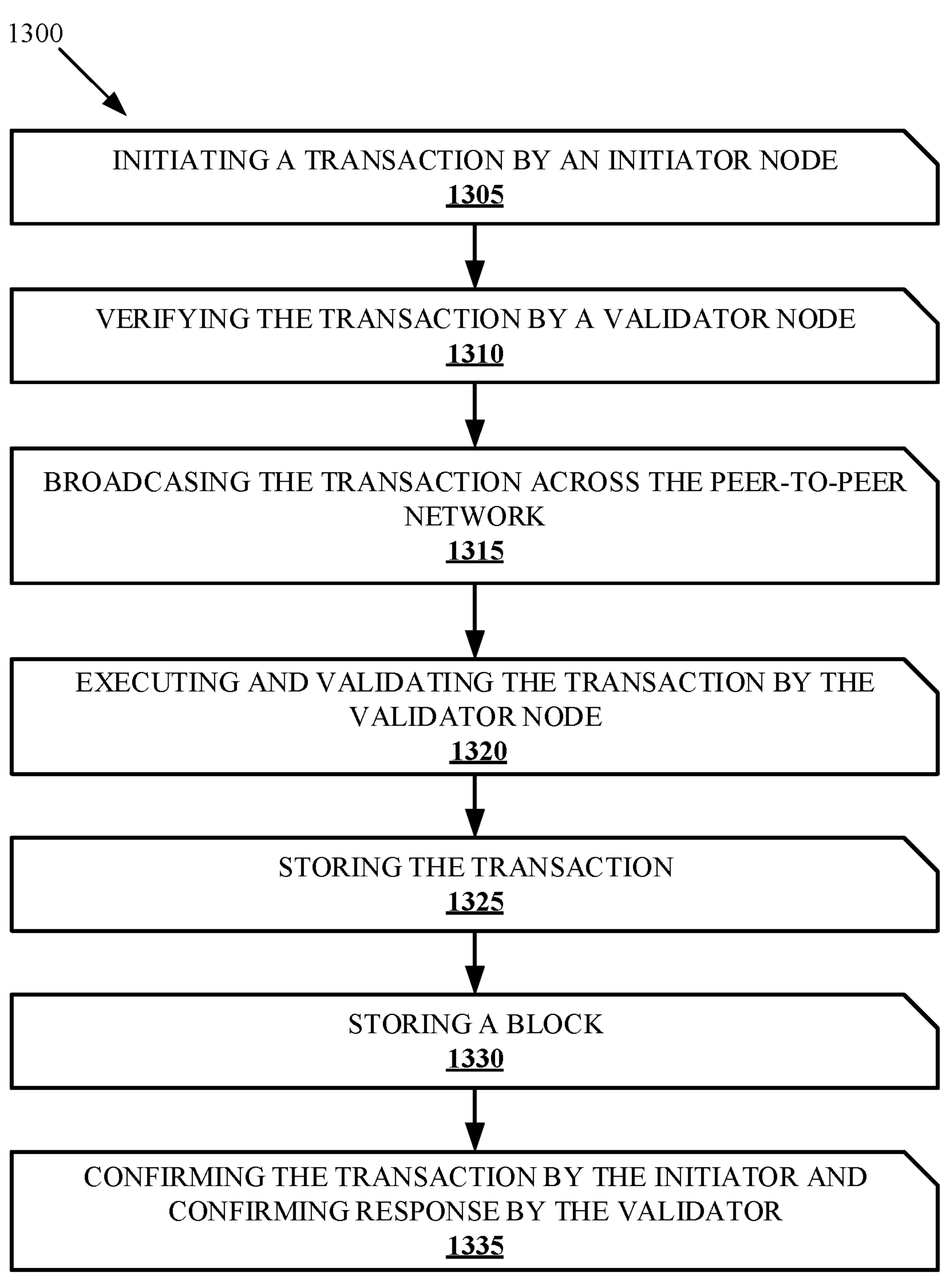
Figure 18:
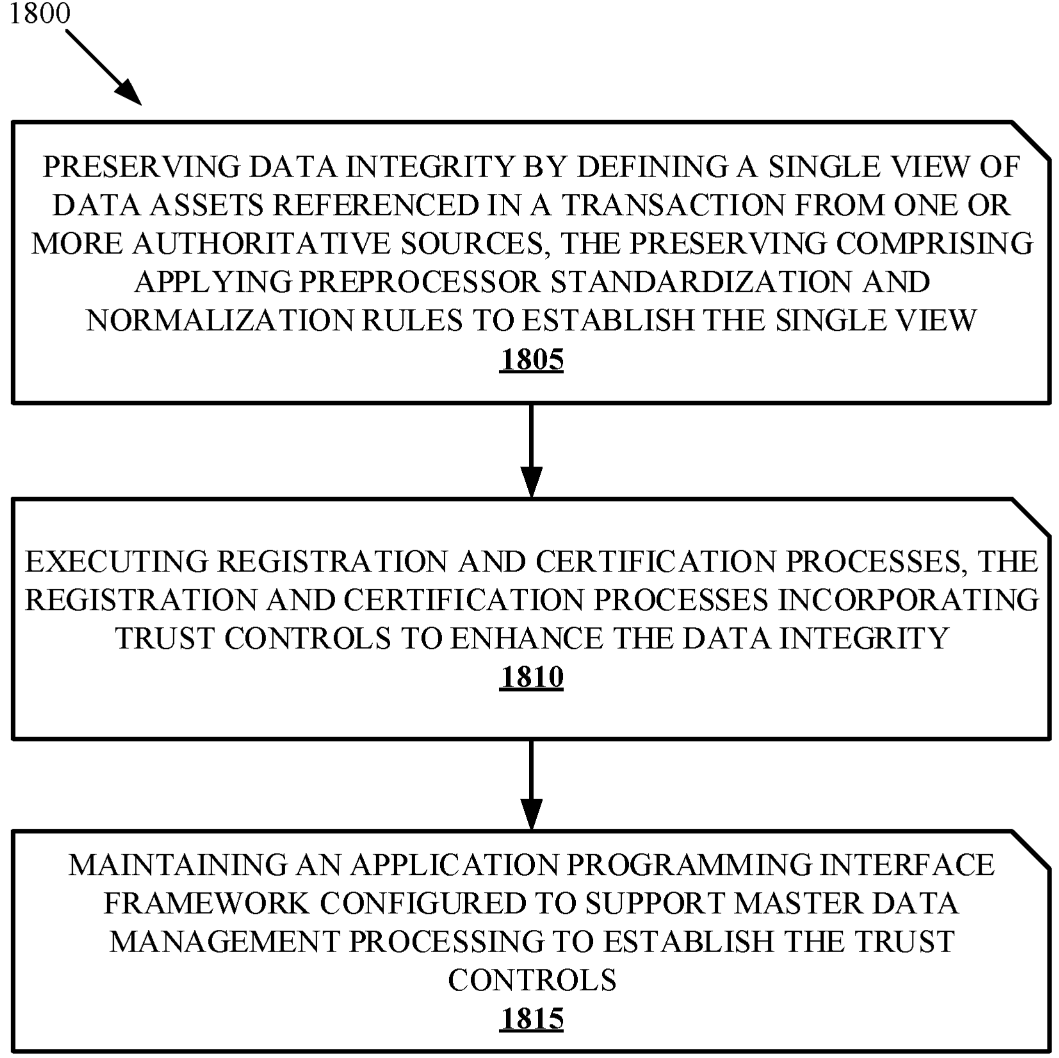
Figure 19:
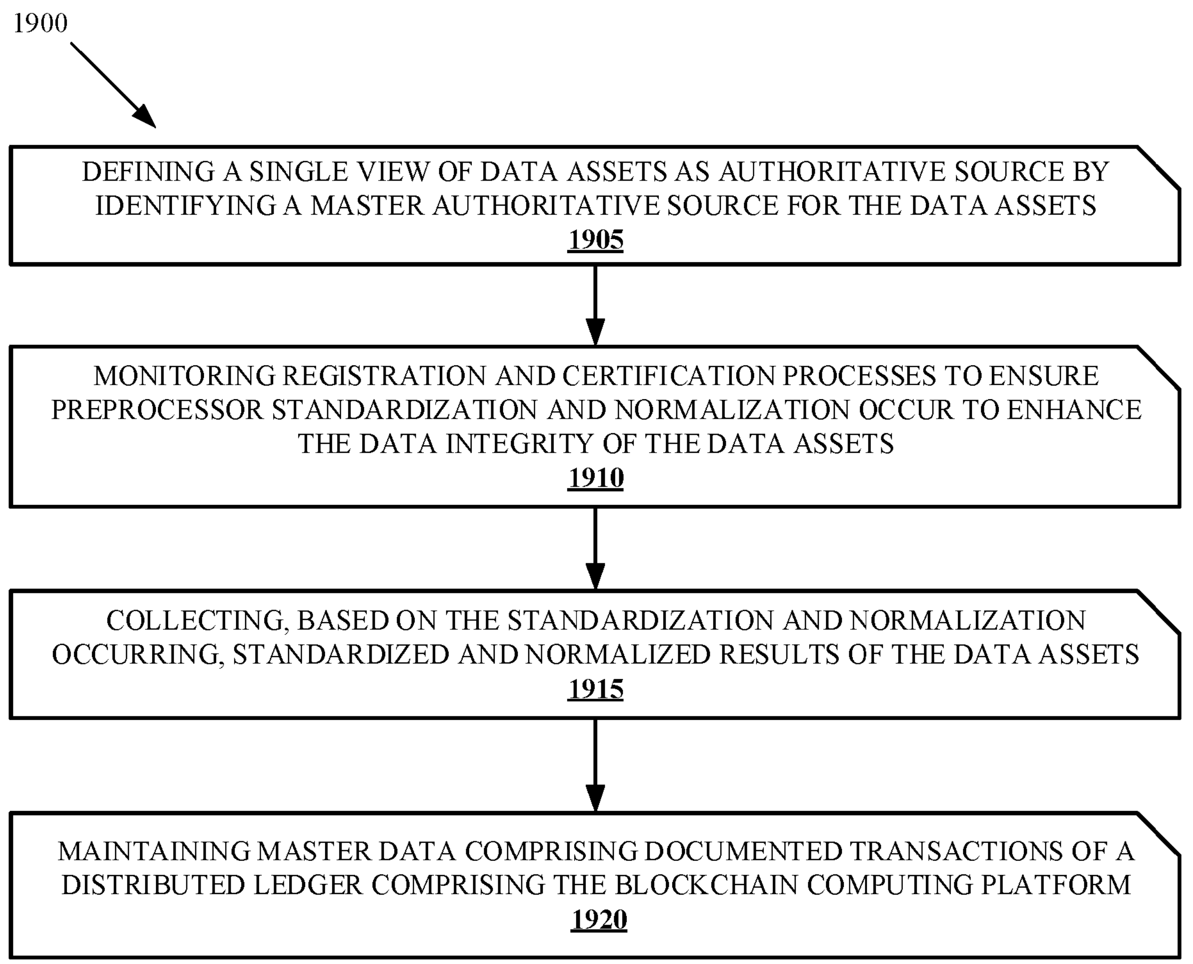
Figure 20:
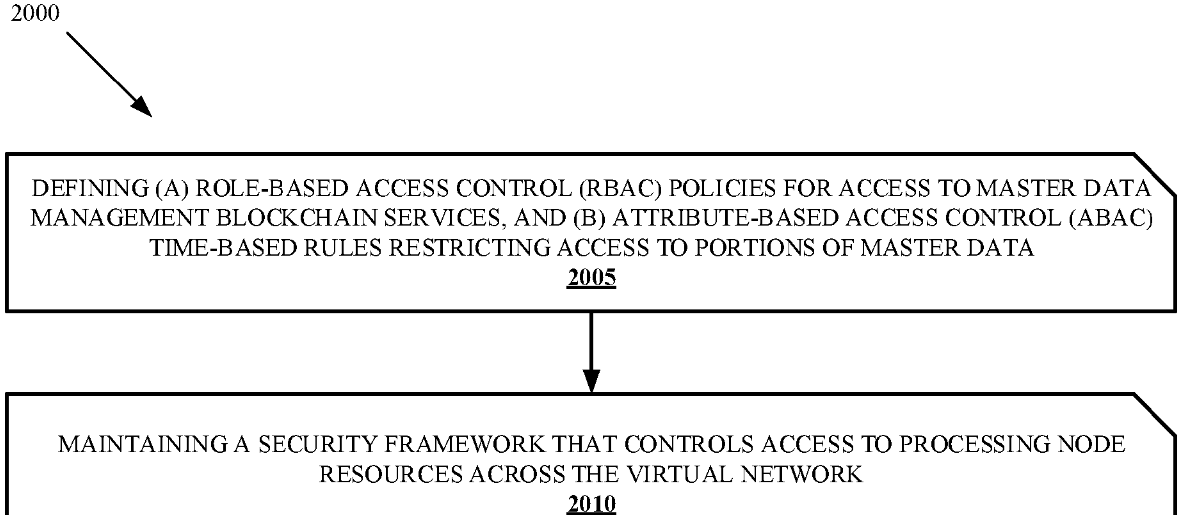
Figure 21:
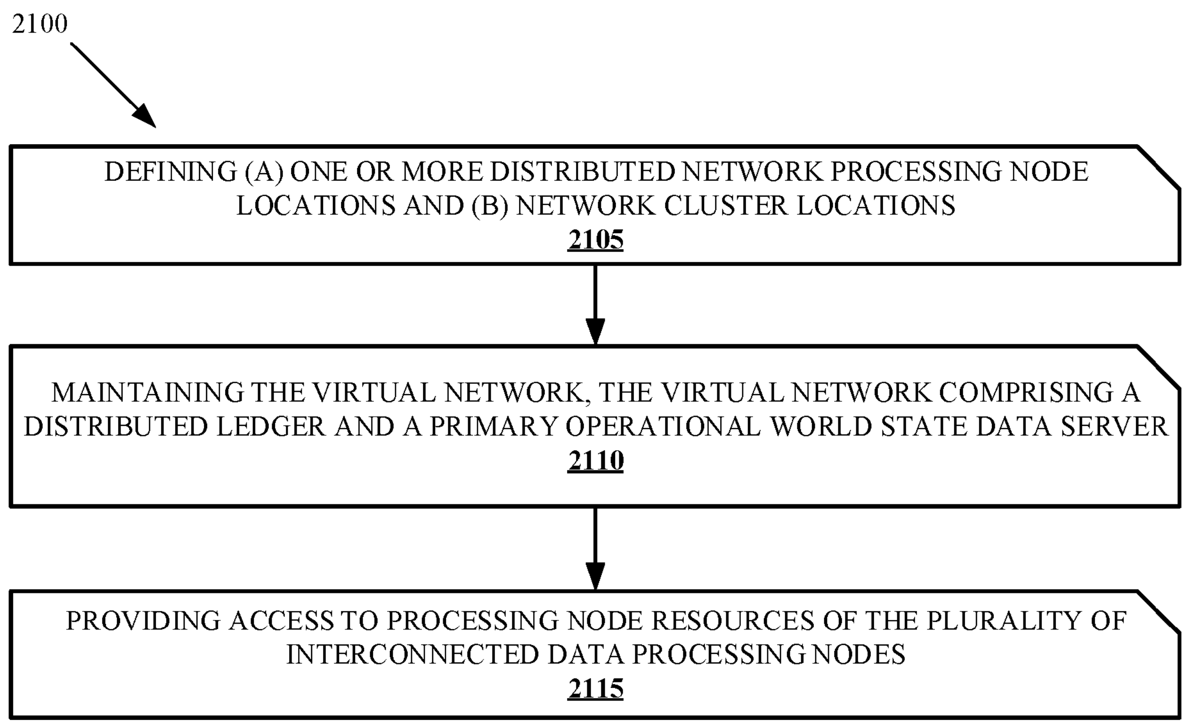

Having thus described embodiments of the invention in general terms, reference will now be made to the accompanying drawings, wherein:

FIG. 1A illustrates a master data management (MDM) on blockchain system, in accordance with an embodiment of the present invention;

FIG. 1B illustrates an environment including computing components through which embodiments of the invention may be implemented, in accordance with an embodiment of the present invention;

FIG. 2 illustrates an example strategic master data platform (SMDP) for data asset management, in accordance with an embodiment of the present invention;

FIG. 3 illustrates an example peer node and an example master node to be included in a SMDP for data asset management, in accordance with an embodiment of the present invention;

FIG. 4A illustrates an example master node to be included in a SMDP for data asset management, in accordance with an embodiment of the present invention;

FIG. 4B illustrates an example peer node to be included in a SMDP for data asset management, in accordance with an embodiment of the present invention;

FIG. 5 illustrates an example document flow system, in accordance with an embodiment of the present invention;

FIG. 6A depicts an example authoritative SMDP trust control, in accordance with an embodiment of the present invention;

FIG. 6B depicts an example algorithmic SMDP trust control, in accordance with an embodiment of the present invention;

FIG. 7 illustrates example of data asset flow within control channels, in accordance with an embodiment of the present invention;

FIG. 8 illustrates an example SMDP data asset flow of operations, in accordance with an embodiment of the present invention;

FIG. 9 illustrates an example interim architecture for a SMDP, in accordance with an embodiment of the present invention;

FIG. 10 illustrates an example target architecture for a SMDP, in accordance with an embodiment of the present invention;

FIG. 11 depicts a block diagram of an example method for actions performed by embodiments of the SMDP system, in accordance with an embodiment of the present invention;

FIG. 12 depicts a block diagram of an example method of actions performed by embodiments of a plurality of peer nodes of a peer-to-peer computing network of a strategic master data computing environment, in accordance with an embodiment of the present invention;

FIG. 13 depicts a flowchart illustrating a method of actions performed by embodiments of the MDM on blockchain system according to embodiments of the invention;

FIG. 14 depicts a block diagram of an example method of a computing system incorporating a blockchain framework configuration for trust control of master data management, in accordance with an embodiment of the present invention;

FIG. 15 depicts a block diagram of an example method of a computing system incorporating a blockchain framework configuration for trust control of master data management, in accordance with an embodiment of the present invention;

FIG. 16 depicts a block diagram of an example method of a computing system of a blockchain computing platform providing trusted master data, in accordance with an embodiment of the present invention;

FIG. 17 depicts a block diagram of a method of a blockchain computing platform providing trusted master data, in accordance with an embodiment of the present invention;

FIG. 18 depicts a block diagram of a method of a computing platform that is configured to facilitate node-based master data asset management incorporating data integrity preservation via trust controls, in accordance with an embodiment of the present invention;

FIG. 19 depicts a block diagram of a method of a strategic master data management blockchain computing platform, in accordance with an embodiment of the present invention;

FIG. 20 depicts an example block diagram of a method of a strategic master data management blockchain computing platform, in accordance with an embodiment of the present invention; and FIG. 21 depicts an example block diagram of a method strategic master data management blockchain computing platform, in accordance with an embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. It is to be understood that the disclosed embodiments are merely illustrative of the present invention and the invention may take various forms. Further, the figures are not necessarily drawn to scale, as some features may be exaggerated to show details of particular components. Thus, specific structural and functional details illustrated herein are not to be interpreted as limiting, but merely as a representative basis for teaching one skilled in the art to employ the present invention. Like numbers refer to like elements throughout. Unless described or implied as exclusive alternatives, features throughout the drawings and descriptions should be taken as cumulative, such that features expressly associated with some particular embodiments can be combined with other embodiments.

Unless defined otherwise, technical and scientific terms used herein have the same meaning as commonly understood to one of ordinary skill in the art to which the presently disclosed subject matter pertains. Descriptions of well-known processing techniques, systems, components, etc. are omitted to not unnecessarily obscure the invention in detail. It should be understood that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

The exemplary embodiments are provided so that this disclosure will be both thorough and complete, and will fully convey the scope of the invention and enable one of ordinary skill in the art to make, use, and practice the invention.

The specification may include references to "one embodiment", "an embodiment", "various embodiments", "one or more embodiments", etc. may indicate that the embodiment (s) described may include a particular feature, structure or characteristic, but every embodiment may not necessarily include the particular feature, structure, or characteristic. In some cases, such phrases are not necessarily referencing the same embodiment. When a particular feature, structure, or characteristic is described in connection with an embodiment, such description can be combined with features, structures, or characteristics described in connection with other embodiments, regardless of whether such combinations are explicitly described. Thus, unless described or implied as exclusive alternatives, features throughout the drawings and descriptions should be taken as cumulative, such that features expressly associated with some particular embodiments can be combined with other embodiments.

The terms "couple", "coupled", "couples", "coupling", "fixed", "attached to", and the like should be broadly understood to refer to connecting two or more elements or signals electrically and/or mechanically, either directly or indirectly through intervening circuitry and/or elements. Two or more electrical elements may be electrically coupled, either direct or indirectly, but not be mechanically coupled; two or more mechanical elements may be mechanically coupled, either direct or indirectly, but not be electrically coupled; two or more electrical elements may be mechanically coupled, directly or indirectly, but not be electrically coupled. Coupling (whether only mechanical, only electrical, or both) may be for any length of time, e.g., permanent or semi-permanent or only for an instant. "Communicatively coupled to" and "operatively coupled to" can refer to physically and/or electrically related components.

In the technology field of virtual computing, a "virtual machine" is a software program that emulates a hardware system, the VM is a self-contained program designed and deployed to simulate a distinct machine instance that runs within an isolated partition of a single physical computer. Subdivided units of physical CPU and memory resources like time, disk space, and access to input/output devices are all predefined for each virtual machine. A "node" is a collection of CPU and memory resources, virtual or physical, the node is the smallest unit of self-sufficient computing power designed and deployed as a host processor to other software programs, like pods (operating systems) and containers (applications)—simulating a distinct machine instance. Note that a node is a specific type-instantiation of virtual hardware.

In addition, as used herein, the terms "about", "approximately", or "substantially" for any numerical values or ranges indicate a suitable dimensional tolerance that allows the device, part, or collection of components to function for its intended purpose as described herein.

A "pod" is a collection of related or 'like' containers, packaged together to maximize the benefits of CPU and memory resource sharing, the pod is the smallest execution environment designed and deployed to control the allocation and usage of physical resources shared among hosted containers (applications). Note that a pod is a specific type-instantiation of a virtual operating system.

A "container" is a standalone executable software package; the container is a software image that includes everything needed to run an application: code, runtime, system tools, system libraries and settings. Note that a container is a specific type-instantiation of a virtual application.

In the field of virtual networking, a "virtual network" is a designated collection of interrelated software programs; the virtual network is an architected implementation of interconnected physical devices, servers, and virtual machines as nodes. It enables the ability to locate, access, connect, secure, and adjust resources for use across the network.

A "network cluster" is a local collection of nodes; the network cluster is an architected grouping of nodes that can coordinate workload among member nodes to increase efficiency and overall performance. Note that a cluster is a specific type-instantiation of local group constituent nodes in a virtual network.

A "distributed network" is a remote association of nodes by their relative location, the distributed network is an architected arrangement of nodes that can distribute workload among member nodes to increase efficiency and overall performance. Note that a distribution is a specific type-instance of remote group constituent nodes in a virtual network.

"Master data" or "mastering" as it is sometimes called, first establishes a pattern, model or schema for "what is" master data by definition and "what is not." Change Management for Master Data will subsequently use that definition as the basis for maintaining the content quality and relational integrity back to the larger context "Master" as new changes to the data are received and applied over time. Peer-to-peer interaction based on algorithmic governance controls enables different parts of the enterprise to engage and participate in a single Strategic Enterprise Platform with MDM on Blockchain at its core. That solid foundation builds confidence and trust across Data Asset Network applications.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code can include both software and hardware. For example, program code in certain embodiments of the present invention can include fixed function hardware, while other embodiments can utilize a software-based implementation of the functionality described. Certain embodiments combine both types of program code.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Embodiments of the invention provide an innovative and well-planned Master Data Management Strategy by creating a new set of foundational elements for the development and delivery of a Strategic Master Data Platform (SMDP) as part of a larger Strategic Enterprise Platform—based on a 'reimagined' vision of Strategic Enterprise Data Access. In particular, the MDM on blockchain system 101 includes an enterprise platform that implements a distributed ledger in a multiparty business network. For instance, as depicted, the MDM on blockchain system 101 includes a distributed network of nodes within the enterprise platform that incorporate a copy of an immutable ledger configured to store data asset records of decentralized applications from multiple parties. According to various embodiments, either all of the nodes or a subset of nodes maintain the copy of the immutable ledger. The peer nodes may use trust protocols to safely and securely write to the master ledger. The master ledger may be configured to store object codes (e.g., smart contracts) and the object codes may be triggered by events and executed collectively by the peer nodes.

Referring generally to all the figures, and specifically to FIG. 1A, and according to various embodiments of the invention, the master data management (MDM) on blockchain system 101 has distinct capabilities in four domains including methodology, technology, networking, and applications. As discussed elsewhere herein, master data is a trusted representation of "data about the business entities that provide context for business transactions." Master data is a business data asset. In order to correctly capture and maintain the value associated with those data assets, MDM is structured with strong capabilities in the four domains of methodology, technology, networking, and applications.

Methodology—the strategic methodology for MDM requires a new set of practices, procedures, methods, and rules to manage Master Data in a more effective and efficient way. According to embodiments of the invention described herein, Master Data is managed as a Data Asset in a partially-decentralized, 'federated-source' Data Asset Ledger. This ledger methodology involves modification and combination of both a registry and coexistence. MDM currently has four recognized architectural implementation styles including registry, consolidated, coexistence, and centralized. Embodiments of the present invention, however, implement and enable a fifth ledger implementation system that modifies and combines registry and coexistence to establish a master ledger and distributed ledger copies as the best logical way to support an enterprise's needs for data, business information and records management.

As implemented via embodiments of the invention, this new ledger style adapts the registry style to drive the development of a multifaceted Ledger, with a Master Ledger to register new, unique Data Assets, and any number of Distributed Ledger copies; along with the Coexistence style in operations to support Onboarding, Servicing and Nurturing of those value-assigned Data Assets throughout their useful life. Enterprise sections benefit from adopting Data Assets and this new Ledger Methodology into their existing processes and workflows as a single, relatable, Data Management paradigm.

As discussed herein, the master data definition or "mastering" first establishes a pattern, model or schema for "what is" Master Data by definition and "what is not." Change Management for Master Data subsequently uses that definition as the basis for maintaining the content quality and relational integrity back to the larger context "Master" as new changes to the data are received and applied over time.

Using Ledger Methodology, Master Data is defined in pattern, model and schema as parts of a lifecycle definition of Enterprise Data about 'real world' Data Assets that need to be registered and monitored for changes over time with respect to their record entries in the Data Asset Ledger. Reference Data, Master Data and Transaction Data are three classifications of Enterprise Data.

With regard to ledger entry and record maintenance, Candidate Data Assets for Data Asset Ledger Entry can come to the attention of Business Lines of Business (LOBs) either actively or passively. Active Peer participation in the composition, confirmation and publication of new Data Asset Ledger Entries is the preferred method of engagement; however, Passive Data Flow contributions may come from 'raw' data pulled from existing enterprise processes and workflows. Thus, "Mastering" under Ledger Methodology becomes a distributed process of rendering each new Data Asset as a new Data Asset Ledger Entry in the Data Asset Ledger.

Ledger-based Records Management for new Data Asset Changes simplifies to be a repeatable iteration of the distributed process for "Mastering" under Ledger Methodology described above. Assessments of "changes" to the Candidate Data Asset are compared to the most recent, previous instance (recorded on the Data Asset Ledger), to validate the content quality and verify the relational integrity of the newly composed version of Data Asset to confirm its value and purpose as the next Data Asset Ledger Entry. Data Assets that add (validated) new values or necessarily remove (verified) values are recorded as that next new, now current, Data Asset Ledger Entry. Data Assets that "match" the current Data Asset version, having no valuable "changes" to add to the Data Asset Ledger, are dropped without entry. Importantly, standard Match & Merge functions are no longer needed when applying this novel Ledger Methodology. The Ledger Methodology is the basis of a Party Master and subsequent Master Data Domain instances for a Product Catalog, User Master, Usage Log, Investor Master and Portfolio Ledger.

Technology—Regarding the technology domain, Strategic Technology for the Strategic Master Data Platform requires a new set of mechanisms, service protocols, services and storage capabilities to manage Master Data using Ledger Methodology. Master Data managed as a Data Asset in a partially-decentralized, 'federated-source' Data Asset Ledger and is constructed using a Blockchain Framework for Distributed Ledger Technology, with data more readily available via a shared architecture Multi-Model Database of Core and Extended data structures. A Blockchain Framework and Distributed Ledger Technology is utilized. As discussed herein, Data Asset Management is the process of acquiring, monitoring and leveraging business Data Assets to create value and purpose. Efficient utilization, tracking and optimization come from having established a framework for effective Data Asset Management. The Blockchain Framework enables an effective means of implementing Data Assets—as Block records in a Chain listing, i.e. the Data Asset Ledger. Once a new Data Asset Block has been established, Distributed Ledger Technology will manage that new Data Asset Ledger Chain until there are no more, new Data Asset Ledger Entry Blocks to be added or removed from the Data Asset Ledger Chain. In this way, Distributed Ledger Technology on a Blockchain Framework will establish a Master Ledger and Distributed Ledger copies as the best technical way to support an enterprise's needs for data, business information and records management.

This new Blockchain Framework provides a Registry-style foundation for the development of a network-based, multifaceted Data Asset Ledger, with a Master Ledger to register unique Data Assets, and any number of Distributed Ledger copies. Deployed as a reference architecture for the framework, Distributed Ledger Technology acts as an overlay for Coexistence-style Operating Model support of Onboarding Prospect Blocks, Servicing Client Blocks and Nurturing Investor Blocks for the management of value-assigned Data Assets as Blockchain records throughout their useful life in the Party Master. Enterprise sectors benefit from implementation of embodiments of the invention, Blockchain and Distributed Ledger Technology into their existing enterprise processes and workflows as a single, unifying, Service Management paradigm: acquiring, monitoring and leveraging business data assets for efficient utilization, tracking and optimization. The new Strategic Master Data Platform is the product of this integrated technology. For data storage, embodiments of the invention enable a Multi-Model Database Technology to expand and empower the enterprise with new unstructured, document, and complex relational hierarchy data types in support of Blockchain and Distributed Ledger Technology.

Networking—Regarding the networking domain, Strategic Networking for the new Strategic Enterprise Platform requires a new set of connectivity tools, communications protocols, interfaces and messaging capabilities to manage Master Data according to the new Ledger Methodology. Master Data managed as a Data Asset in a partially-decentralized, 'federated-source' Data Asset Ledger is constructed using a Blockchain Framework and Distributed Ledger Technology with data flows riding on a Distributed Network Environment. It is important to understand dad asset management for the Strategic Enterprise Platform over the Distributed Network Environment.

Data Asset Management is the process of acquiring, monitoring and leveraging business Data Assets to create value and purpose. Efficient utilization, tracking and optimization come from having established a framework, in this case a Blockchain Framework for effective Data Asset Management. Further, the benefits of economical communication, reconciliation and synchronization for a sound and secure Distributed Network Environment.

Embodiments of the invention provide a Strategic Master Data Platform that includes a first peer-to-peer (P2P) Node on a larger Distributed Network Environment known as the Strategic Enterprise Platform. Using a Blockchain Framework as a better means of implementing Data Assets—as Block records in a Chain listing, i.e. the Data Asset Ledger, the Strategic Master Data Platform P2P Node serves primarily as Listener, Receiver, Validator and Arbiter relative to the fulfillment of Smart Contracts for the resolution of Data Asset discrepancies. Once a new Data Asset Block has been established, Distributed Ledger Technology will manage that new Data Asset Ledger Chain until there are no more, new Data Asset Ledger Entry Blocks to be added or removed from the Data Asset Ledger Chain.

As a P2P Node on the Strategic Enterprise Platform, the new Strategic Master Data Platform uses Distributed Ledger Technology on a Blockchain Framework to establish a Master Ledger. This Ledger maintains the "world state" for the Master Data it manages as Data Assets in the Data Asset Ledger.

Other P2P Nodes within the Distributed Network Environment maintain Distributed Ledger copies locally available throughout the Strategic Enterprise Platform. This managed communication, reconciliation and synchronization provides the best of both worlds in support of the enterprise's needs for data, business information and records management. As P2P Nodes, they too will serve as Listener, Receiver, and Validator in working towards Protocol Consensus; however, they will also be acting as Dialer, Sender, and Initiator in managing Data Assets in the Data Asset Ledger much more than the Strategic Master Data Platform.

This new Strategic Enterprise Platform Blockchain Framework provides a Registry-style foundation for the development of a network-based, multifaceted Data Asset Ledger, with a Master Ledger P2P Nodes to register unique Data Assets, and any number of Distributed Ledger copy P2P Nodes. Deployed as a reference architecture for the framework, Distributed Ledger Technology will act as an overlay for Coexistence-style Operating Model support of Onboarding Prospect Blocks, Servicing Client Blocks and Nurturing Investor Blocks for the management of value-assigned Data Assets as Blockchain records throughout their useful life in the Master Ledger P2P Node called the Party Master.

Enterprise sections benefit from establishing their own Distributed Ledger copy P2P Nodes so their Distributed Applications can fully participate in the Strategic Enterprise Platform and its underlying Distributed Network Environment. The new integrated network establishes the potential for Strategic Enterprise Data Access to a degree never previously achieved. This is a new way to develop network-enabled Applications.

By incorporating P2P Nodes into existing enterprise processes and workflows, Applications can build on a single, unified, Data Availability Network paradigm: acquiring, monitoring and leveraging business data assets for efficient utilization, tracking and optimization, with economical communication, reconciliation and synchronization. This new Strategic Enterprise Platform is the product of integrated technology and coordinated networking as a Distributed Network Environment.

Applications—Regarding the applications domain, Strategic Applications with new Strategic Enterprise Data Access require a new set of security tools, access & use protocols, authentication and authorization capabilities to manage Master Data according to the new Ledger Methodology. Master Data managed as a Data Asset in a partially-decentralized, 'federated-source' Data Asset Ledger is constructed using a Blockchain Framework and Distributed Ledger Technology with data flows riding Strategic Enterprise Platform Nodes communicating across a Distributed Network Environment. As discussed previously, Data Asset Management is the process of acquiring, monitoring and leveraging business Data Assets to create value and purpose. Efficient utilization, tracking and optimization come from having established a framework, in this case a Blockchain Framework for effective Data Asset Management. Further, the benefits of economical communication, reconciliation and synchronization on a sound and secure Distributed Network Environment for Distributed Applications with Strategic Enterprise Data Access. Enterprise sections benefit from establishing their own Distributed Ledger copy P2P Nodes so their new Distributed Applications can fully participate in the Strategic Enterprise Platform and its Distributed Network Environment. The new integrated network establishes the potential for a new Ledger SDK for sound Distributed Applications development and secure Data Asset Ledger operations equipped with first Modernized Data Access, and now Strategic Enterprise Data Access.

FIG. 1B illustrates a computing system 100 and environment thereof, according to at least one embodiment. The computing environment generally includes a user 110 that benefits through use of embodiments of the MDM on Blockchain innovations described herein that are offered by a provider through an enterprise system 200. The computing environment may include, for example, a distributed cloud computing environment (private cloud, public cloud, community cloud, and/or hybrid cloud), an on-premise environment, fog computing environment, and/or an edge computing environment. The user 110 accesses services and products associated with MDM on Blockchain provided by the enterprise system 200 by use of one or more user devices, illustrated in separate examples as a computing device 104 and a mobile device 106. Example user devices 104, 106 may include, as non-limiting examples, a smart phone, a portable digital assistant (PDA), a pager, a mobile television, a gaming device, a laptop computer, a camera, a video recorder, an audio/video player, radio, a global positioning system (GPS) device, or any combination of the aforementioned, or other portable device with processing and communication capabilities. In the illustrated example, the mobile device 106 is illustrated in FIG. 1B as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example, any suitable operating system and/or software application configured to manage device resource, generate user interface, accept user inputs, and facilitate communications with other devices among other functions. Example operating systems or software applications can include, as non-limiting examples, Linux®, UNIX®, Windows®, macOS®, iOS®, Android®, and any other known operating system used on personal computers, central computing systems, phones, and other devices.

The user 110 can be an individual, a group, or any entity in possession of or having access to the user device 104, 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device 104, 106, but as more particularly illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

According to various embodiments, the memory device 122 and storage device 124 may be combined into a single storage medium. The memory device 122 and storage device 124 can store any of a number of applications which comprise computer-executable instructions and code executed by the processing device 120 to implement the functions of the user device 104, 106 described herein. For example, the memory device 122 may include such applications as a conventional web browser application and/or an enterprise-distributed application (e.g., a mobile application), collectively referred to herein as a "web portal". These applications also typically provide a graphical user interface (GUI) on the display 140 that allows the user 110 to communicate via the user device 104, 106, with, for example, an enterprise system 200 (e.g., a banking system), and/or other devices or systems. For instance, the GUI display screens may include features for displaying information and accepting inputs from users, such as fillable text boxes, data fields, hyperlinks, pull down menus, check boxes, and the like.

In one embodiment, when the user 110 decides to establishes an online account with an enterprise system 200, the user 110 may download or otherwise obtains a client application from the enterprise system 200, or from a distinct application server. In other embodiments, the user 110 interacts with the enterprise system 200 via a web browser application in addition to, or instead of, the downloadable client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user 110.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices may include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Further non-limiting examples of input devices and/or output devices of the input and output system 136 may include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The input and output system 136 may also be configured to obtain and process various forms of authentication to obtain authentication information of a user 110 in order to provide, for example, access to a specific web portal of the enterprise system 200. For instance, the web portal may be accessed based on the user providing authentication information to log in to the web portal in order to perform various functionalities described herein. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a predetermined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a GPS configured to be used by a positioning system to determine a location of the computing device 104 or mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a location to determine that the mobile device 106 is located proximate these known devices.

In the illustrated example, a system intraconnect 138 (e.g., a system bus), connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which global system for mobile communication (GSM) voice calls, SMS text, enterprise messaging service (EMS), multimedia messaging service (MMS) messaging, time division multiple access (TDMA), code division multiple access (CDMA), personal digital cellular (PDC), wideband CDMA (WCDMA), CDMA2000, and general packet radio service (GPRS), are all non-limiting and non-exclusive examples. Thus, communications can be conducted, for example, via the wireless communication device 152, which can be or include a radio-frequency transceiver, a Bluetooth device, Wi-Fi device, a near-field communication device, and other transceivers. In addition, GPS may be included for navigation and location-related data exchanges, ingoing and/or outgoing. Communications may also or alternatively be conducted via the connector 154 for wired connections such as by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (TDMA), GSM, and/or IS-95 (CDMA), or with third-generation (3G) wireless communication protocols, such as Universal Mobile Telecommunications System (UMTS), CDMA2000, WCDMA and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The processing device 220 may perform functionalities of the disclosed systems and methods described herein. For instance, in one non-limiting example, the processing device 220 of the computing system 206 may be configured to provide access to a web portal of the enterprise system 200. Further, the processing device 220 may be configured to perform data processing to embed variable data and generate a scannable image comprising embedded variable data. Additionally, the processing device 220 may provide, via a network 258, the user device 104, 106 with access to the scannable image via the web portal.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

Furthermore, the computing device 206, may be or include a workstation, a server, or any other suitable device, including a set of servers, a cloud-based application or system, or any other suitable system, adapted to execute, for example any suitable operating system, including Linux®, UNIX®, Windows®, macOS®, iOS®, Android®, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1B.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1B. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1B, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

Generally, traditional MDM systems have a number of deficiencies. As defined above, master data is a trusted representation of "data about the business entities that provide context for business transactions." Master Data is a business data asset. Traditional MDM packages are incomplete. Known issues include those listed in TABLE 1 below:

TABLE 1

| Traditional MDM | Known Issues<br>Italics = (Manual workaround processing)<br>or (Missing data or capability) |
|---|---|
| Shared Static Keys | Inconsistent reconciliation; constantly going out of sync in source applications |
| *Source Data Quality* | *Wide variations between source applications and the master data results* |
| Search Optional | Data re-entered repeatedly without first looking for an existing party record |
| Send and Forget | Source applications are not invested in realizing business value from master data |
| Relational Integrity | *Missing and incongruent values go unchallenged - letting fraud go unidentified* |
| Business Rules | Embedded within the code: business rules are hard to change and rarely are changed |
| *Results Reporting* | *Store and forward of redundant copies, data misinterpretation, and discrepancies* |

Various embodiments of the present invention that incorporate a strategic master data platform. The strategic master data platform (SMDP) includes a blockchain platform comprised of a peer-to-peer network in which all (or a subset) of peer nodes maintain a copy of an immutable ledger to store data asset records of decentralized applications. The peer nodes of the peer-to-peer network use trust protocols to safely and securely write to a data asset ledger. The SMDP can advantageously be used as an enterprise platform that implements a distributed ledger in a multiparty business network. The SMDP data asset ledger provides various advantages in security, quality, search capabilities, data processing, data integrity, data governance, and data audit capabilities. The SMDP data asset ledger can store object codes (smart contracts), which are triggered by events and executed collectively by peers. Smart contracts are used to model digital assets and related business rules that overlay the platform coordination protocol to maintain the state of an asset autonomously in the data asset ledger. This functionality is key in enabling creation of decentralized systems that are run by peer nodes as well as the creation of a central authority and/or intermediary.

A "blockchain" is a growing list of records, called blocks, which are securely linked together using cryptography. Blockchain creates an immutable listing of transactions in a ledger. Master data is a trusted representation of the data about the business entities that can provide context for such business transactions. A comparison between traditional MDM and embodiments of the present invention, termed "MDM on Blockchain" is show in TABLE 2 below.

TABLE 2

| Capability | Traditional MDM<br>None = missing capability<br>Italics = manual processing | MDM on Blockchain |
|---|---|---|
| Security | User IDs and Static Keys | Entity, Node and Data Asset IDs |
| Quality | *None (validation on demand)* | Up-Front Validation |
| Search | Data Attribute Matching | Data Asset 'Fingerprint' Matching |
| Processing | Centralized Controller Paradigm | Decentralized Consensus Protocol |
| Integrity | *Evergreen & Back Office Processing* | Real-Time Verification Monitoring |
| Governance | Embedded Business Rules | Smart Contract - Trust Controls |
| Audit | *None (extract on demand)* | Immutable Blocks |

Blockchain can be used to satisfy the need for a package-built solution while filling the gaps that Traditional MDM leaves unsatisfied. Embodiments of the present invention, so-called MDM on Blockchain goes further: proposing an innovative and well-planned Master Data Management Strategy creates a new set of foundational elements for the development and delivery of a Strategic Master Data Platform (SMDP) as part of a larger Strategic Enterprise Platform—based on a 'reimagined' vision of Strategic Enterprise Data Access. MDM on Blockchain is a foundational enterprise solution.

FIG. 2 illustrates an example strategic master data platform (SMDP) 201 for data asset management, in accordance with an embodiment of the present invention. The SMDP 201 is constructed from strategic master data platform (SMDP) nodes forming an enterprise data asset network where governance control is provided by both authoritative and algorithmic flows. In particular, the SMDP 201 can be incorporated as part of a SMDP data asset network that provides advantages in data association, data acquisition, data authentication, user authorization, data analysis, and data aggregation. For instance, the SMDP 201 can be configured to provide up-front validation and real-time verification. Generally speaking, each of the network nodes in the SMDP includes four layers of abstraction: access, network, service, and data. The SMDP 201 may include, for example, a mentor node 207 and a plurality of peer nodes 203. Each node (both the mentor node 207 and the plurality of peer nodes 203) may include four layers. Specifically, the four layers may include an access layer 211, a network layer 213, a service layer 217, and a data layer 219.

The SMDP 201 may be configured to perform eight primary functions, specifically initiation, verification, broadcast, execution and validation, transaction storage, coordination, block storage, and confirmation. The layers and functions in MDM on Blockchain set the stage for dedicated capabilities with assigned responsibilities by component.

The SMDP 201 is a decentralized system because it relies on distributed control that depends on the work of lower-level components operating on local information. In distributed control, each component of the system is equally responsible for contributing to the system objective by acting in the appropriate manner—depending on algorithmic trust controls. Advantageously, decentralized systems facilitate local interactions between components to establish order and coordination in order to manage data assets. Further, the SMDP 201 is also a centralized system because it relies on a controller to instruct components, either directly or indirectly through a hierarchy of entities. The components are further configured to instruct a next-lower-level-node through authoritative trust controls. Common examples may include instances in which suppliers and consumers transact business with each other directly in open digital ecosystems or when organizations participate in a multiparty business process (e.g., a supply chain). The centralized system provides a governance for network interactions and transactions between nodes to establish oversight for the data asset ledger.

Embodiments of the invention provide a strategic master data platform (SMDP). A blockchain platform composed of a peer-to-peer network in which all (or a subset) of peer nodes maintain a copy of an immutable ledger to store data asset records of decentralized applications. The peers use trust protocols to safely and securely write to the Data Asset Ledger or 'Master Ledger.' The SMDP is an enterprise platform implementing a distributed ledger in multiparty business network. The SMDP data asset ledger can store object codes (smart contracts), which are triggered by events and executed collectively by peers. Smart contracts are used to model digital assets and related business rules that overlay the platform coordination protocol, to maintain the state of an asset autonomously in the Data Asset Ledger. This is key in enabling creation of decentralized systems that are run by peers along with a central authority and/or intermediary. In the SMDP's data asset management protocol, peers, such as peer node 203 (or peer node 303 shown in FIG. 3), interact with other peers to achieve consensus on the identity of the Data Assets referenced in a transaction and an endorsement of the ultimate disposition of the transaction in the Master Ledger.

Advantageously, the SMDP 201 incorporates immutable data structures (e.g., blocks on the blockchain), coordination protocols stored to the master ledger, and smart contracts stored to the master ledger. The SMDP 201 also provides interoperability, usability, and a reliable production-grade digital ecosystem.

FIG. 3 illustrates an example peer node 303 and an example master node 307 to be included in a SMDP for data asset management, in accordance with an embodiment of the present invention. In particular, as depicted the peer node 303 and the master node 307 are configured to perform differing functionalities. The master node 307 may include a master ledger and the peer node 303 may include a distributed ledger, which may include a copy of the master ledger. In particular, the process flow depicted within the peer node 303 may provide algorithmic trust control, whereas the process flow depicted within the master node 307 may provide authoritative trust control. Embodiments of the invention, termed MDM on Blockchain, are innovative in their combination of governance systems. Decentralized Governance Controls are used for peer-to-peer interaction between peers, such as peer node 303, whereas Centralized Governance Controls provide oversight and resolution or 'arbitrated' consensus via a master node, such as master node 307. Enterprise Policy manages data discrepancies in certain embodiments.

The SMDP includes a decentralized system control using peer nodes such as peer node 303. The decentralized system relies on distributed control that depends on the work of lower-level components operating on local information. In such distributed control, each component of the system is equally responsible for contributing to the system objective by acting in the appropriate manner—depending on Algorithmic Trust Controls. Decentralized systems facilitate local interactions between components to establish order and coordination to manage the Data Assets. This is appropriate and sufficient for most peer-to-peer interactions. Endorsement of transactions through peer consensus is based on this system model.

Embodiments of the SMDP utilize centralized governance controls using a master node such as master node 307. A centralized system relies on a controller to instruct components either directly, or through a hierarchy of entities, to instruct the next lower-level node—through Authoritative Trust Controls. The centralized system provides governance for network interactions and transactions between nodes to establish oversight for the Data Asset Ledger. This system model supports Approval of transactions.

FIGS. 4A and 4B illustrate an example master node 407 and an example peer node 403 to be included in a SMDP for data asset management, in accordance with an embodiment of the present invention. In particular, the different types of data assets and/or other business assets depicted may be respectively stored either to the master ledger of the master node 407 or the distributed ledger of the peer node(s) 403. The master node 407 is configured to provide authoritative trust control and the peer node 403 is configured to provide algorithmic trust control. Both trust control functionalities are used as appropriate to the need.

The SMDP smart contracts stored by the master ledger of the master node 407 provide enhanced development and deployment and are the preferred integrated development environment (IDE). The smart contract allows for compilation, linking, deployment, binary management, automated testing, and auditing, thereby facilitating improved maintenance and migration. Smart contracts also allow for interactive execution and simulation as well as development, security, and operations support. Smart contracts also allow for configurable build pipeline and integration as well as blockchain prototyping for decentralized applications. Additionally, decentralized applications can be further simplified through libraries. Smart contracts also provide trusted runtime execution through supported runtime execution technologies, security measures, available performance benchmarks, a web assembly format, and parallel processing. Smart contracts can also be written using various programming languages that can be compiled to bytecode for addressing the needs of different backends. There are also a number of bytecode vulnerability analysis tools, and the application binary interface (ABI) of a smart contract advantageously allows for the smart contract to communicate and interact with external applications and other smart contracts, and the disclosed embodiments allow for ABI function analysis and control flow.

Smart contract client application programming interfaces (APIs) may correspond directly with the properties and methods of the smart contract and may be created at runtime based on the generated ABI. An API is a set of libraries that make up the core language that can be used and core API software development kits (SDKs) can be created for different programming languages. Third-party API SDKs may also be used. Smart contracts may also allow for API pattern support for representational state transfer (REST) APIs that conforms to the constraints of REST architectural style and allows for interaction with RESTful web services. Other formats may also be supported including, for example, a JavaScript Object Notation (JSON) API that works with HTTP or Binary Javascript Object Notation (BSON). Additionally, the smart contract service may allow for a depth of functionality for preferred API SDK and ease of learning and use of API SDK. The APIs may allow for improved transaction and data query performance and varying ABI and low-level programming skills. The master node 407 may also provide for various API functional maintenance and support.

The smart contracts may also provide for trusted integration using inherent trusted integration mechanisms, third-party trusted integration mechanisms, master data services and integration, and blockchain events that are translated for consumption. Additionally, the smart contracts may allow for master data reliability with zero points of failure. Various support mechanisms are also possible including external reference data provider support, external on-chain or off-chain service support, enterprise application template and connector support, and inherent off-chain computing support. Additionally, master data services may include defense in depth.

Referring now to FIG. 4B, the peer node 403 may be engineered to provide support for various data asset sources and membership, registration of various sources and nodes, mechanisms to prove and bind sources'/nodes' identity, protocols to verify sources'/nodes' identity, a digital signature algorithm, and processes managing sources'/nodes' identity life cycle. Further, the peer node 403 may be configured as an operating model for enrolling sources/nodes and may provide identity technologies supporting various membership services or may include components of various membership services.

The peer node 403 may also be configured to provide key management functionalities including cryptographic key generation and assignment of sources/nodes, secure storage of cryptographic keys and metadata, discovery and use of cryptographic keys and metadata, cryptographic key life cycle management (including traceability and revocation), backup and recovery of cryptographic keys and metadata, and compromised key revocation and replacement.

The peer node 403 may also be configured to provide various privacy functions including privacy preservation in user authentication, privacy preservation in user attribute exchange protocol, privacy preservation in transaction validation protocol, a user consent mechanism to share an attribute with a third party, privacy-related policy definition and execution in different protocols, as well as mechanisms to maintain confidentiality at rest, in motion, and in use. Further, the peer node 403 may also be configured to provide various privacy preserving technologies including, for example, zero knowledge, a trusted execution environment, and multiparty computation.

The peer node 403 may also be configured to store various data to the distributed ledger including blockchain data (e.g., coordination protocols—enterprise blockchain, authority-based distributed consensus protocols, distributed ordering and endorsement services, protocols to ensure availability of interactions/transactions and guarantee safety of interactions/transactions, protocols to prevent double entry attacks, strength advantages protocol, compensating factors for any weakness, randomness, secure permissioned network, inherent technical security controls, and independent and objective performance benchmarks). Additionally, other data stored to the distributed ledger across the peer node 403 may include on-chain data (e.g., blockchain repository, blockchain platform infrastructure, interaction/transaction formation and sequencing within a block, data asset block formation and sequencing within a data structure, metadata storage, block header attributes, smart contract storage within a data structure, strength advantages—data structure and repository, and compensating factors for any weakness).

The peer nodes, such as peer node 403, may also provide for a network ecosystem and multiparty environment that incorporates a blockchain data asset model, authorization tokens, incentives for peer-node operators, cost model for gateway node users, managing the supply of computing resources and demand, and controls to enhance platform security.

The APIs provided by the peer nodes, such as peer node 403, may support various interactions/transactions via a distributed ledger (e.g., storage in the data structure of data assets and states, blockchain state model, data structure encoding—JSON/BSON, on-chain database storage), off-chain state management (e.g., native features for receiving and storing data off-chain, third party dependencies for receiving and storing data off-chain, data identification/discovery mechanisms, data retrieval and delivery mechanisms, and data integrity verification), as well as ledger-to-ledger interoperability (e.g., native features for ledger-to-ledger interoperability, third party dependencies for ledger-to-ledger interoperability, connecting mechanisms for connecting chains and ledgers, shared security mechanisms to join chains and ledgers, event handling and cross-chain/ledger transaction flow, governance mechanisms to oversee cross-chain/ledger transactions, mechanisms to bridge chains/ledgers to other (public) networks, and available SDKs to enable cross-chain/ledger transactions in distributed applications).

The peer nodes, such as peer node 403, are also suitable for various ecosystem or multiparty environments by providing governance automation (e.g., node identification, providing and qualifying for network admittance, node life cycle management functions performance and automation, mechanism to audit node compliance to network rules, demand intake mechanisms for new/enhancement requirements, solution provider collaboration mechanisms for design specifications, and stakeholder mechanisms for approving features and requirements).

Additionally, peer nodes, such as peer node 403, can provide for on-chain scalability through mechanisms to enhance client node performance, coordination mechanisms for consensus or endorsement performance, mechanisms to increase platform efficiency, mechanisms to enable multiple native chains/ledgers in the platform, native models to dynamically control supply and demand, mechanisms to enable complementary side-chains, and mechanisms to enable off-chain computing and storage.

Peer nodes, such as peer node 403, also provide access control by providing entitlement definition and assignment in the blockchain platform, policy definition and enforcement in the platform, mechanisms to enable private transactions between user nodes, mechanisms to enable private chains between user nodes, and mechanisms to control access to private transactions or chains.

FIG. 5 illustrates an example document flow system 575, in accordance with an embodiment of the present invention. In particular, the document flow system 575 provide an example embodiment for how the differing data assets and business assets are interrelated and what versions or assets are stored to the master ledger and/or distributed ledger.

FIG. 6A depicts an example authoritative SMDP trust control 621 and FIG. 6B depicts an example algorithmic SMDP trust control, in accordance with various embodiments of the present invention. The authoritative SMDP trust control 621 is a business-level trust control. Business-level trust requires trusted issuance, registration and exchange, or verification and tracking, of an autonomous asset in a data asset ledger that is shared among all or a subset of participants in a peer-to-peer network. The Data Asset Ledger is a coordinated, replicated, shared and synchronized data asset controlled among participants in a federated business process. This enables multiple entities that are operating on the same asset in different steps of a process to use the same ledger instead of establishing, managing and protecting their own ledgers. A Data Asset in this context is the managed state of an autonomous asset that evolves over time through a set of state transition events. These events are best represented and stored as blocks in a blockchain. The final step is the certification of these Data Assets in the Master Ledger.

The algorithmic SMDP trust control of FIG. 6B is a technical-level trust control. Technical-level trust requires trusted and secure computing, communication and storage of objects that represent the autonomous data assets—objects both in motion (e.g. JSON) and at rest (blocks) supporting the various forms, functions and states of each data asset. In various embodiments of the invention, some key technical enables include flexible ‘interpreted’ document data structures for objects in motion, a decentralized consensus or endorsement protocol, and an immutable and tamper-evident data structure (blockchain) for the ledger. Although a blockchain data structure is the core component of a blockchain platform, there are many more components, e.g. documents, that contribute to platform data and functionality.

FIG. 7 illustrates example of data asset flow 731 within control channels, in accordance with an embodiment of the present invention. Peer-to-peer interaction based on algorithmic governance controls provides a solid foundation for Master Data Definition better than Traditional MDM can provide. Embodiments of the invention provide for a combination of governance systems that creates two different control channels: the business channel where data flows from sender to master to receiver and vice versa, and the technical channel where data assets flow from initiator to arbiter to validator and vice versa. Enabling two Control Channels brings both flexibility and responsible authority to MDM results.

FIG. 8 illustrates an example SMDP data asset flow of operations 833, in accordance with an embodiment of the present invention. In particular the SMDP data asset flow of operations 833 include the eight functions overlaid on the SMDP mastered peer-to-peer network. Specifically, the eight functions include initiation, verification, broadcast, execution and validation, transaction storage, coordination, block storage, and confirmation. Optionally, a confirmation response may also be included.

FIG. 9 illustrates an example interim architecture 961 for a SMDP, in accordance with an embodiment of the present invention. In particular, a mainframe architecture 963 and a cloud-based architecture 967 are depicted. FIG. 10 illustrates an example target architecture 1069 for a SMDP, in accordance with an embodiment of the present invention.

FIG. 11 depicts a block diagram of an example method 1100 for actions performed by embodiments of the SMDP system, in accordance with an embodiment of the present invention. The SMDP—blockchain computing platform includes a multiparty business network and is configured to perform, at block 1105, collective virtual machine processing to generate virtual computing results to define a coordination protocol. At block 1110, virtual computing results are aggregated as master data, where the master data includes schema-defined data facilitating trust control across a multiparty business network to be incorporated in the coordination protocol. Additionally, at block 1115, the coordination protocol is implemented across the multiparty business network.

Further, according to various embodiments, the SMDM—blockchain computing platform may technically deploy the multiparty business network as a peer-to-peer computing network that includes a plurality of interconnected data processing nodes, where the plurality of interconnected data processing nodes provide computing power. The peer-to-peer computing network is configured to (1) support one or more pods, wherein the one or more pods comprise processing environments, and (2) invoke one or more concurrent containers, the one or more concurrent containers comprising application programs, the invoking occurring as necessary to dynamically scale up to meet technical performance requirements associated with functionality, services, and data.

In addition, the network platform is further configured to establish and maintain existence of the plurality of interconnected data processing nodes, where the plurality of interconnected data processing nodes include an immutable master ledger or master ledger copy comprising logs and history, wherein the immutable master ledger or master ledger copy is configured to store data asset records in the master data, wherein the data asset records are obtained based on at least one of actively collecting the data asset records or passively deriving the data asset records, wherein the data asset records are obtained from decentralized application transactions. In addition, the plurality of interconnected data processing nodes include an operational world state data server with current state results the data actively available, based upon certification of the master data, by query against the master data. The plurality of interconnected data processing nodes may also include an application programming interface (API) configured to (i) provide access to the services and the data, (ii) facilitate construction and deployment of a custom UI for transaction functionalities for MDM blockchain, wherein the transaction functionalities for MDM blockchain are selected from the group consisting of Create, Retrieve, Update and Delete. According to various embodiments, the plurality of interconnected data processing nodes may also include multiple coordinated search capabilities to identify (a) provenance of the data as well and (b) effective transactional progress of the data that comprises data history, and (c) a current world state in the MDM blockchain.

In various embodiments, the SMDM—blockchain computing platform may be configured such that each node of the plurality of interconnected data processing nodes includes four functional layers, the four functional layers including an access layer, a network layer, a service layer, and a data layer, each node being relative to its instantiated distributed ledger copy and operational world state data server. Further, according to various embodiments, at least one node of the plurality of interconnected data processing nodes may include a master node, where the master node is configured to provide additional functional responsibilities relative other nodes of the plurality of interconnected processing nodes. Also, the master node may include four functional layers, where the four functional layers include an access layer, a network layer, a service layer, and a data layer, the master node being relative to its instantiation of the master ledger and primary operational world state data server.

According to one embodiment, the plurality of interconnected data processing nodes may include a plurality of peer nodes that each include an identity management access layer. The identity management access layer is configured to perform a method that includes defining (a) role-based access control (RBAC) policies for access to the services, and (b) attribute-based access control (ABAC) time-based rules restricting access to portions of the data, where the portions of the data include (i) secure private data, and (ii) sensitive documents that are accepted and held with consent. Additionally, the identity management access layer is further configured to maintain an authentication, authorization, and accounting (AAA) security framework that controls access to a distributed network of processing node resources, enforces policies, and audits usage. The identity management access layer may also be configured to use enterprise active directory user identifications (User IDs) and digital certificate authority (CA) certificates to identify and grant access to the distributed network of processing node resources in accordance with the policies.

According to various embodiments, the plurality of peer nodes of the SMDM—blockchain computing platform may also include an availability management network layer, where the availability management network layer is configured to perform a method that includes defining (i) one or more distributed network processing node locations and (ii) network cluster locations that include a local plurality of interconnected processing nodes. The availability management network layer may also be configured to maintain a distributed-ledger-technology, data-availability-node network that includes a distributed ledger and a primary operational world state data server. The availability management network layer may also be configured to use enterprise message queue (MQ) interfaces and blockchain synchronized data to provide availability and localized access to the distributed network of processing node resources, wherein the distributed network of processing node resources is configured to be accessed using open and orchestrated communications that comprise two levels of trust control channel messaging. According to one embodiment, the two levels of trust control channel messaging may include a decentralized control system comprising some or all of the plurality of peer nodes, wherein the system relies on distributed control depending on work of lower-level components operating on local information, wherein each component of the system is equally responsible for contributing to a system objective by acting in the appropriate manner according to algorithmic trust controls to achieve consensus. Further, the two levels of trust control channel messaging may also include a centralized control system comprising some or all of the plurality of peer nodes comprising a controller configured to instruct components either directly or through a hierarchy of entities, the components being instructed to further instruct a respective next lower-level node according to authoritative trust controls, thereby providing supervision for network interactions between multiple nodes of the plurality of peer nodes to establish oversight for peer interactions and approval of endorsed transactions, thereby applying governance.

According to various embodiments, the plurality of peer nodes may further include an asset management service layer, where the asset management service layer is configured to perform a method that includes defining a single view of the data from authoritative sources. Additionally, the asset management service layer may also be configured to apply preprocessor standardization and normalization and execute Registration and Certification processes. Further, the asset management service layer may also be configured to maintain a create, retrieve, update and delete (CRUD) MDM API framework comprising a distributed ledger and a primary operational world state data server set of services, wherein execution of the services are defined and controlled through smart contracts comprising business rules collectively programmed to interoperate and support processing of MDM transactions in response to occurrence of one or more predetermined events. According to one embodiment, the one or more predetermined events may be implemented by chain code invoked by the decentralized control system to direct the processing of the MDM transactions to contribute to a programmed system objective. The chain code may be invoked, according to various embodiments, in accordance with consensus-based algorithmic trust controls configured to coordinate the plurality of peer nodes, and in accordance with authoritative trust controls configured to supervise network interactions between the plurality of peer nodes, the authoritative trust controls being used by a centralized control system comprising a controller that is configured to instruct components either directly or through a hierarchy of entities to further instruct a next lower-level node in accordance with the authoritative trust controls, thereby establishing governance and oversight for MDM standard peer interactions, resolution of non-consensus peer-to-peer interactions, and approval of endorsed MDM transactions. According to one embodiment, the asset management service layer may also be configured to use an enterprise representational state transfer (REST) API engine and blockchain query services to transfer a representation of a requested data asset's state to a requesting distributed application (dApp), the transfer being executed via batch automation that is enhanced to near-real time (NRT) or online interactive enhanced to real time (RT).

The plurality of peer nodes may also include, according to various embodiments, a storage management data layer that is configured to perform a method that includes defining a single view of the data as Party Master, Account Master and Relationship Master authoritative sources. Additionally, the storage management data layer may be configured to ensure preprocessor standardization and normalization occur as well as to collect the results of enhanced Master Data Registration and Certification processes. According to various embodiments, the storage management data layer may be configured to maintain Create, Retrieve, Update and Delete (CRUD) MDM master data, where documented transactions of a distributed ledger include the CRUD MDM master data. Additionally, the storage management data layer may also maintain a primary operational world state data server set of Master Data RESTful data assets stored as immutable blocks on blockchain and may use an enterprise grade multi-model database to store (a) JSON format document files to establish and control data quality and relational integrity for core data assets, (b) extended and super extended data, and (c) a coordinated history of master data transactions produced through the networked platform.

According to various embodiments, the SMDM—blockchain computing platform may further be configured to perform registration and certification of the master data, the registration and certification being defined and managed using distributed ledger technology comprising replicated, shared, and synchronized ledgers, the registration and certification facilitating establishing SMDM—blockchain computing functions.

FIG. 12 depicts a block diagram of an example method 1200 of actions performed by embodiments of a plurality of peer nodes of a peer-to-peer computing network of a strategic master data computing environment, in accordance with an embodiment of the present invention. A peer-to-peer computing network may include a plurality of interconnected peer nodes collectively programmed to interoperate based at least in part on a computing environment coordination protocol, where a portion or all of the plurality of peer nodes is configured to, at block 1205, maintain a distributed and immutable master ledger storing data asset records of decentralized applications. At block 1210, a set of trust protocols to securely write to the master ledger are collectively executed, where the trust protocols include a peer node interacting with other peer nodes within the peer-to-peer computing network to achieve consensus on identity of data assets that are referenced in a transaction and to endorse disposition of the transaction in the master ledger. At block 1215, smart contracts are stored on the master ledger where the smart contracts include object codes. At block 1220, the stored smart contracts are executed collectively by a portion or all of the plurality of peer nodes. Further, the smart contracts are executed in response to occurrence of a predetermined event or events. In addition, the smart contracts may be configured to model digital assets and related business rules that overlay the computing environment coordination protocol. The trust protocols may also include decentralized governance controls used for peer-to-peer network interactions and centralized governance controls that provide oversight and resolution of non-consensus peer-to-peer interactions.

According to various embodiments, the blockchain strategic master data computing environment may be configured to manage discrepancies in data by an enterprise policy. Further, each node of the plurality of interconnected peer nodes may include a plurality of layers that include, for example, an access layer, a network layer, a service layer, and a data layer. According to various embodiments, at least one of the plurality of interconnected peer nodes may include a master node that includes a plurality of layers that include an access layer, a network layer, a service layer, and a data layer. According to one embodiment, the immutable master ledger that is configured to store data asset records of decentralized applications may include logs and history of data asset records.

According to various embodiments, the peer-to-peer computing network may include a decentralized control system that includes some or all of a plurality of the peer nodes, where the system relies on distributed control that depends on work of lower-level components operating on local information, and where each component of the system is equally responsible for contributing to a system objective by acting in the appropriate manner according to algorithmic trust controls. Further, the peer-to-peer computing network may include a centralized control system comprising some or all of a plurality of the peer nodes comprising a controller configured to instruct components either directly or through a hierarchy of entities, to instruct the next lower-level node according to authoritative trust controls, thereby providing governance for network interactions between nodes to establish oversight for a data asset ledger and approval of interactions. Additionally, in some example embodiments, the plurality of interconnected peer nodes include an API for access to services an data stored within the peer-to-peer computing network.

Referring now to FIG. 13, a flowchart illustrates a method 1300 for performing the various functions of the SMDP mastered peer-to-peer network. The first step, as represented by block 1305 is to initiate a transaction by an initiator node in a peer-to-peer network. The next step, as represented by block 1310, is to verify the transaction by a validator node in the peer-to-peer network. The next step, as represented by block 1315, is to broadcast the transaction across the peer-to-peer network. The next step, as represented by block 1320, is to execute and validate the transaction by the validator node. The next step, as represented by block 1325, is to store the executed and validated transaction. The next step, as represented by block 1330, is to store a block on the blockchain (i.e., on a distributed ledger of the peer-to-peer network). In addition, the final illustrated step, as represented by block 1335, is to confirm the transaction by the initiator node and confirm a response by the validator node confirming the transaction. According to various embodiments, a consensus is obtained based on confirming the transaction by the initiator node and responsively confirming the transaction by the validator node, the consensus providing endorsement of the transaction thereby providing an algorithmic trust control. Additionally, an arbiter node may be configured to act as an intermediary between the initiator node and the validator node, and the method 1300 may further be configured to resolve any data asset discrepancies between the initiator node and the validator node. According to one embodiment, the data asset discrepancies between the initiator node and the validator node that are resolved include an identity of the data assets referenced in the transaction.

According to various embodiments, a controller is configured to instruct components either directly or through a hierarchy of entities to instruct the arbiter node according to authoritative trust controls for discrepancy resolution, where the controller provides centralized governance controls thereby providing oversight and resolution of non-consensus peer-to-peer interactions. According to one example, an arbiter node is configured to initiate synchronization of a master data management source record by providing an endorsement of ultimate disposition of the transaction to a master ledger. Further, according to one example, the method 1300 may also include certifying data assets of the transaction in the master ledger.

FIG. 14 depicts a block diagram of an example method 1400 of a computing system incorporating a blockchain framework configuration for trust control of master data management, in accordance with an embodiment of the present invention. At block 1405, a blockchain framework is configured, where the blockchain framework includes a master data asset ledger and a plurality of peer nodes. The master data asset ledger may be configured to autonomously maintain current values of a set of ledger states, and the master data asset ledger may include object codes that overlay a coordination protocol of a plurality of peer nodes, where the plurality of peer nodes are collectively configured to maintain a copy of the object codes and are each configured to store data asset records of respective decentralized applications. At block 1410, access to the blockchain framework is provided to facilitate coordinated data asset management of the master data asset ledger and the plurality of peer nodes in accordance with the coordination protocol, where the coordinating includes (i) obtaining endorsement of one or more transactions through peer consensus of the plurality of peer nodes, and (ii) instructing one or more peer nodes of the plurality of peer nodes to apply a trust control maintained by the master data asset ledger, the trust control being based on the endorsement of the one or more transactions.

According to various embodiments, the program instructions are further executable by the one or more processors to facilitate maintenance of the master data asset ledger, where the maintenance includes passive rendering of one or more data assets to be entered to the master data asset ledger and assessing any changes to the current values of the set of ledger states. Further, according to various embodiments, the maintenance also includes determining that the one or more data assets include a newly composed data asset that is distinct from the current values of the set of ledger states, and based thereon content quality is validated and relational integrity of the newly composed data asset is verified to confirm a new value. Additionally, in one example, a new data asset entry is provided to the master data asset ledger, where the new data asset entry modifies a current value of the current values of the set of ledger states with the new value.

According to one embodiment, the program instructions are further executable by the one or more processors to facilitate maintenance of the master data asset ledger, where the maintenance includes passive rendering of one or more data assets to be entered to the master data asset ledger, and assessing any changes to the current values of the set of ledger states. Further, it may be determined that one or more data assets are unchanged from the current values of the set of ledger states, and based thereon the one or more data assets to be entered are dropped without providing a new data asset entry to the master data asset ledger.

According to various embodiments, the master data asset ledger and the plurality of peer nodes may each include a plurality of layers, where the plurality of layers are selected from the group consisting of an access layer, a network layer, a service layer, and a data layer.

Further, in one example, the set of ledger states may include records of decentralized applications, and the object codes may include smart contracts that are triggered by events and executed collectively by the plurality of peer nodes. Additionally, the blockchain framework may be further configured to be implemented across a multiparty business network that incorporates decentralized applications. Endorsement of one or more transactions may be achieved through peer consensus of the plurality of peer nodes, which may incorporate algorithmic trust control using a set of state transition events stored as blocks within the blockchain framework. Further, the trust control may also include a centralized authoritative trust control.

FIG. 15 depicts a block diagram of an example method 1500 of a computing system incorporating a blockchain framework configuration for trust control of master data management, in accordance with an embodiment of the present invention. At block 1505, a computing network is configured that includes a blockchain framework, where the blockchain framework includes a plurality of peer nodes configured to collectively execute a set of trust protocols to endorse disposition of a transaction in a master ledger that is configured to store data asset records of decentralized applications. At block 1510, access to the configured peer-to-peer computing network is provided to one or more computing devices, where the access facilitates coordinated data asset management via the blockchain framework. According to one embodiment, the computing network further includes a plurality of decentralized multiparty applications that are interconnected via the plurality of peer nodes of the blockchain framework. According to various embodiments, the computing network further includes a strategic master data platform for managing master data of the master ledger. Additionally, the blockchain framework may further include the master data ledger, and wherein the master ledger is further configured to store smart contracts comprising object codes, the smart contracts being executable by one or more nodes of the plurality of peer nodes.

In various embodiments, the set of trust protocols may include decentralized algorithmic system controls and centralized authoritative governance controls. Further, the centralized authoritative governance controls may rely on a controller to instruct lower-level nodes within the blockchain framework.

FIG. 16 depicts a block diagram of an example method 1600 of a computing system of a blockchain computing platform providing trusted master data, in accordance with an embodiment of the present invention. At block 1605, a portion of an application programming interface (API) is called, via a user device, to access a portion of a current state data server of the blockchain computing platform that is configured to perform virtual machine processing, where the blockchain computing platform includes a plurality of interconnected data processing nodes. The data processing nodes include a master ledger configured to store data asset records for master data received from decentralized application transactions performed via the plurality of interconnected data processing nodes. The data processing nodes also include a plurality of peer nodes configured to provide cryptographic algorithmic trust control for master data management of the master data. Further, the calling may include an API call to the current state data server to obtain current state results of one or more certified transactions in the master ledger, where the one or more certified transactions have been certified at least in part via an endorsement protocol. At block 1610, current state results of the one or more certified transactions are received from the current state server and displayed via a user interface of the user device.

According to various embodiments, the API is configured to facilitate construction and deployment of a custom user interface to provide transaction functionality where the transaction functionality includes create, retrieve, update, and delete functions. In some examples, the data asset records may include logs and history of data assets passively derived from decentralized application transactions. Further, the endorsement protocol certifying the one or more certified transactions may be performed based on replicating, sharing, and synchronizing ledgers of the plurality of peer nodes. In some embodiments, calling the portion of the API to access the portion of the current state data server comprises incorporating a coordinated search of the blockchain computing platform to identify provenance of data, transactional progress, and current world state. In some embodiments, each node of the plurality of interconnected data processing nodes comprises a plurality of functional layers including an access layer, a network layer, a service layer, and a data layer.

In some examples, the plurality of interconnected data processing nodes form a peer-to-peer computing network configured to support one or more processing environments that invoke one or more application programs. Additionally, the peer-to-peer computing network may include a multi-party business network and the blockchain computing platform utilizes smart contracts to model business rules overlaying the endorsement protocol.

FIG. 17 depicts a block diagram of a method 1700 of a blockchain computing platform providing trusted master data, in accordance with an embodiment of the present invention. The method 1700 may include establishing, at block 1705, a plurality of processing nodes, where the processing nodes include an immutable master ledger that includes data asset records for master data. The processing nodes may also include an operational world state data server with current state data, as well as an application programming interface (API) that is configured to provide access to data and construct and deploy a custom user interface (UI). At block 1710, existence of the plurality of processing nodes may be maintained.

According to various embodiments, at least a portion of the master data may be actively collected from decentralized application transactions, and/or at least a portion of the master data may be passively derived from decentralized application transactions. In some embodiments, the processing nodes may further include one or more copies of master data of the immutable master ledger, and the master data asset records may include stored logs and history of data assets. In some embodiments, the operational world state data server may be configured for query to obtain a copy of the master data, where the master data is certified. In some embodiments, the custom user interface (UI) may be constructed to provide transaction functionality that includes create, retrieve, update, and delete functions.

FIG. 18 depicts a block diagram of a method 1800 of a computing platform that is configured to facilitate node-based master data asset management incorporating data integrity preservation via trust controls, in accordance with an embodiment of the present invention. The computing platform may be configured to facilitate node-based master data asset management that incorporates data integrity preservation via trust controls where the computing platform includes one or more virtual machines configured and deployed to execute an operating system to access the computing platform via a virtual network, where the computing platform comprises a blockchain computing platform. Further, the computing platform may include a plurality of interconnected data processing nodes each comprising a plurality of functional layers, where the plurality of functional layers include an asset management service layer that is configured to establish a blockchain computing function. The blockchain computing function may include a method that includes, at block 1805, preserving data integrity by defining a single view of data assets referenced in a transaction from one or more authoritative sources, the preserving comprising applying preprocessor standardization and normalization rules to establish the single view. At block 1810 registration and certification processes may be executed, where the registration and certification processes incorporate trust controls to enhance the data integrity. At block 1815, an application programming interface framework is maintained that is configured to support master data management processing to establish trust controls.

In some example embodiments, the single view of the data assets may be defined using consensus on identity of the data assets. Further, the master data management processing may include creating, retrieving, updating, and deleting master data. In some examples, the application programming interface framework includes a distributed ledger, where the distributed ledger includes a distributed and immutable master ledger that is configured to store data asset records of decentralized applications. In some embodiments, the application programming interface framework includes a plurality of world state data server set of services, where execution of the services are defined and controlled through smart contracts. For instance, the smart contracts may include business rules that are collectively programmed to interoperate and support processing of the data assets referenced in the transaction.

In some embodiments, the transaction may occur in response to one or more predetermined events that are implemented by chain code and invoked by a decentralized control system to direct processing of the transaction. Further, the transaction may be configured to contribute to a programmed system objective, and the chain code may be invoked, in part, according to consensus-based algorithmic trust controls configured to coordinate the plurality of interconnected data processing nodes. In some embodiments, the chain code is also invoked, in part, according to authoritative trust controls configured to supervise network interactions among the plurality of interconnected data processing nodes, where the authoritative trust controls are implemented by a controller of a centralized control system. In some embodiments, the controller may be configured to instruct, either directly or indirectly, components through a hierarchy of entities. The hierarchy of entities may be configured to further instruct a next lower-level node in accordance with the authoritative trust controls, where the instructing of the components may establish governance and oversight for peer node interactions of the plurality of interconnected data processing nodes. In some examples, instructing the components may also establish resolution of non-consensus peer-to-peer interactions of the plurality of interconnected data processing nodes and approval of endorsed transactions including the transaction.

In various embodiments, the blockchain computing function further comprises using an enterprise representational state transfer (REST) API engine and blockchain query services to transfer a representation of a requested data asset's state to a requesting distributed application (dApp).

In various embodiments, the transfer of the representation may be executed either via batched automation that is enhanced to near-real-time or via online interactive that is enhanced to real time.

FIG. 19 depicts a block diagram of a method 1900 of a strategic master data management blockchain computing platform, in accordance with an embodiment of the present invention. The strategic master data management blockchain computing platform may include one or more virtual machines configured and deployed to execute an operating system of the blockchain computing platform across a virtual network. Further, the computing platform may also include a plurality of interconnected data processing nodes each comprising a plurality of functional layers, wherein the plurality of functional layers comprise a storage management data layer that is configured to establish a blockchain computing function. The blockchain computing function may include a method comprising defining, at block 1905, a single view of data assets as authoritative source by identifying a master authoritative source for the data assets. At block 1910, registration and certification processes are monitored to ensure preprocessor standardization and normalization occur to enhance the data integrity of the data assets. At block 1915, based on the standardization and normalization occurring, standardized and normalized results of the data assets are collected, and at block 1920 master data comprising documented transactions of a distributed ledger that include the blockchain computing platform are maintained.

In some examples, the master authoritative source is selected from the group consisting of a party master, an account master, and a relationship master. Further, the master data may be configured to perform master data management processing that includes creating, retrieving, updating and deleting master data within the documented transactions. In some embodiments, the blockchain computing function may further include maintaining a primary operational world state data server set of master data RESTful data assets stored as immutable blocks on the blockchain computing platform.

In some example embodiments, the blockchain computing function further comprises using an enterprise grade multi-model database to store JSON format document files to establish and control data quality and relational integrity for core data assets. Additionally, the multi-model database may further stored extended and super extended data as well as a coordinated history of master data transactions produced through the blockchain computing platform, where the blockchain computing platform includes a distributed network of processing node resources. In some embodiments, the blockchain computing function may further include using blockchain cryptography and encryption of stored master data that are considered to be "in motion", "in processing", or "at rest".

FIG. 20 depicts an example block diagram of a method 2000 of a strategic master data management blockchain computing platform, in accordance with an embodiment of the present invention. The strategic master data management blockchain computing platform may include one or more virtual machines configured and deployed to execute an operating system of the blockchain computing platform across a virtual network. Further, the computing platform may include a plurality of interconnected data processing nodes each comprising a plurality of functional layers, wherein the plurality of functional layers comprise an identity management access layer that is configured to establish a blockchain computing function. The blockchain computing function may include a method that includes, at block 2005 defining (a) role-based access control (RBAC) policies for access to master data management blockchain services, and (b) attribute-based access control (ABAC) time-based rules restricting access to portions of master data. At block 2010, a security framework may be maintained that controls access to processing node resources across the virtual network.

In some embodiments, the blockchain computing platform is configured to aggregate virtual computing results in master data across the virtual network, and in some examples the portions of the master data include secure private data. According to various embodiments, portions of the master data may include sensitive documents that are accepted by the blockchain computing platform and stored in blocks of the blockchain computing platform with user consent. Further, the security framework may be configured to provide authentication, authorization and accounting functionalities.

In some examples, the security framework controls access to the processing node resources by using an active directory of user identifications and certificate authority certificates to identify and grant access to the processing node resources. Further, the virtual network may be configured with business rules that overlay the virtual network and comprise policies and usage rules. In some examples, the virtual network the plurality of functional layers further comprise an availability management network layer, an asset management service layer, and a storage management data layer.

FIG. 21 depicts an example block diagram of a method 2100 of a strategic master data management blockchain computing platform, in accordance with an embodiment of the present invention. The blockchain computing platform may include one or more virtual machines configured and deployed to execute an operating system of the blockchain computing platform across a virtual network. Further, the blockchain computing platform may include a plurality of interconnected data processing nodes that each include a plurality of functional layers, where the plurality of functional layers include an availability management network layer that is configured to establish a blockchain computing function. The blockchain computing function includes a method that, at block 2105, defines (a) one or more distributed network processing node locations and (b) network cluster locations. At block 2110, the virtual network is maintained, where the virtual network includes a distributed ledger and a primary operational world state data server. At block 2115, access to processing node resources of the plurality of interconnected data processing nodes is provided.

According to one embodiment, the access that is provided may be based on using enterprise message queue interfaces and also based on synchronizing data stored to blocks of the blockchain computing platform. In some examples, the processing node resources may be distributed across the virtual network. Further, the access that is provided may be based on using open and orchestrated communications that include multiple levels of trust control channel messaging, where the multiple levels of trust control channel messaging include two levels of trust control channel messaging that include a decentralized control system and a centralized control system. Further, the decentralized control system may include at least some of the plurality of interconnected data processing nodes, and may be configured to rely on distributed control incorporating lower-level components operating on local information. In some examples, each component of the lower-level components may be provided with equal responsibility for contributing to one or more system objectives in accordance with algorithmic trust controls, where the algorithmic trust controls include consensus-based trust controls in accordance with a consensus of each component of the lower-level components.

In some embodiments, the centralized control system may also include at least some of the plurality of interconnected data processing nodes as well as include a controller configured to instruct components through a hierarchy of entities. Further, each of the components may be configured to further instruct a respective next lower-level node of the plurality of interconnected data processing nodes according to authoritative trust controls. In some embodiments, the controller may be further configured to provide supervision for network interactions between multiple nodes of the plurality of interconnected data processing nodes, where the supervision facilitates oversight of peer interactions through governance. Additionally, the controller may be further configured to obtain approval of endorsed transactions in a master ledger that is configured to store data asset records of decentralized applications.

In the flowchart illustrations and/or block diagrams disclosed herein, each block in the flowchart/diagrams may represent a module, segment, or portion of instructions, which comprises one or more executable instructions for implementing the specified logical function(s). In some implementations, the functions noted in the blocks may occur out of the order noted in the Figures. For example, two blocks shown in succession may, in fact, be executed substantially concurrently, or the blocks may sometimes be executed in the reverse order, depending upon the functionality involved.

Computer program instructions are configured to carry out operations of the present invention and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprise” (and any form of comprise, such as “comprises” and “comprising”), “have” (and any form of have, such as “has” and “having”), “include” (and any form of include, such as “includes” and “including”), and “contain” (and any form contain, such as “contains” and “containing”) are open-ended linking verbs. As a result, a method or device that “comprises”, “has”, “includes” or “contains” one or more steps or elements possesses those one or more steps or elements, but is not limited to possessing only those one or more steps or elements. Likewise, a step of a method or an element of a device that “comprises”, “has”, “includes” or “contains” one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. An enhanced blockchain data computing platform for strategic master data management (MDM), the data computing platform comprising:

a networked integrated technology (IT) platform, wherein the networked IT platform comprises:

at least one processor;

a communication interface communicatively coupled to the at least one processor; and a memory operatively coupled to the processor and storing executable instructions and schema-defined data facilitating trust control across a multiparty business network;

wherein the networked IT platform is configured to:

perform collective virtual machine processing to generate virtual computing results; and aggregate the generated virtual computing results as master data, wherein the master data comprises the schema-defined data facilitating the trust control across the multiparty business network;

wherein performing the collective virtual machine processing includes executing one or more pods comprising processing environments and invoking one or more concurrent containers comprising application programs to dynamically scale computing resources;

wherein aggregating the virtual computing results as master data includes maintaining an immutable master ledger, wherein the immutable master ledger stores data asset records obtained from decentralized application transactions; and providing coordinated access to the data computing platform via an operational world state data server and an application programming interface (API) for MDM functions including creating, retrieving, updating, and deleting of the master data;

wherein business functional processes of Master Data Registration and Certification are defined and managed using Distributed Ledger Technology provided by the data computing platform, that establish functions of the data computing platform;

wherein each node of a plurality of interconnected data processing nodes comprising an availability management network layer responsible for:

defining distributed network processing node locations and network cluster locations with a local plurality of interconnected data processing nodes;

maintaining a Distributed Ledger Technology (DLT) data availability node network comprising a distributed ledger and a primary operational world state data server;

using enterprise Message Queue (MQ) interfaces and Blockchain synchronized data for availability and localized access to a distributed network of processing node resources, with open and orchestrated communications across two levels of Trust Control channel messaging, wherein the two levels of Trust Control channel messaging include:

(a) a decentralized control system comprising some or all of a plurality of the plurality of interconnected data processing nodes, wherein the decentralized control system relies on distributed control depending on work of lower-level components operating on local information, wherein each component of the decentralized control system is equally responsible for contributing to a system objective by acting in an appropriate manner according to algorithmic trust controls; and (b) a centralized control system comprising some or all of a plurality of the plurality of interconnected data processing nodes comprising a controller configured to instruct components either directly or through a hierarchy of entities, to instruct a next lower-level node according to authoritative trust controls, thereby providing supervision for network interactions between nodes to establish oversight for peer interactions and approval of endorsed transactions.

2. The data computing platform of claim 1, wherein the data computing platform is configured to be deployed as a peer-to-peer computing network comprising the plurality of interconnected data processing nodes.

3. The data computing platform of claim 1, wherein the operational business need for the data computing platform's functionality, services, and data are satisfied through established and maintained existence of the plurality of interconnected data processing nodes, wherein the plurality of interconnected data processing nodes include:

the immutable master ledger with logs and history storing the data asset records for the master data collected and/or derived from the decentralized application transactions;

the operational world state data server with data actively available by query against certified master data in the data computing platform;

the API for access to the services and data as well as for construction and deployment of a custom user interface (UI) for creating, retrieving, updating, and deleting of transactions within the data computing platform; and multiple coordinated Search capabilities to identify provenance of data as well as its effective transactional progress and current world state in the data computing platform.

4. The functions of the data computing platform of claim 1, wherein each node of the plurality of interconnected data processing nodes contains a set of four functional layers including at least one of an access layer, a network layer, a service layer, and a data layer relative to its instantiated distributed ledger copy and operational world state data server.

5. The functions of the data computing platform of claim 1, wherein at least one node of the plurality of interconnected data processing nodes is designated as a master node which contains additional functional responsibilities in set of four functional layers, including at least one of an access layer, a network layer, a service layer, or a data layer relative to its instantiation of a master ledger and primary operational world state data server.

6. The functions of the data computing platform of claim 1, wherein each node of the plurality of interconnected data processing nodes contains an identity management access layer, wherein the identity management access layer is responsible for:

defining role-based access control (RBAC) policies for access to services, and attribute-based access control (ABAC) time-based rules for access to secure private data, and certain "sensitive" documents accepted and held with consent;

maintaining an Authentication, Authorization, and Accounting (AAA) security framework that controls access to a distributed network of processing node resources, enforces policies, and audits usage; and using enterprise Active Directory user identifications (IDs) and digital certificate authorities (CA) for identification and granting of access to the distributed network of processing node resources under policy.

7. The functions of the data computing platform of claim 1, wherein each node of the plurality of interconnected data processing nodes contains an asset management service layer responsible for:

defining a "single view" of the data from authoritative sources, applying preprocessor standardization and normalization, and executing Registration and Certification processes;

maintaining Create, Retrieve, Update and Delete (CRUD) MDM API framework comprising a distributed ledger and a primary operational world state data server set of services, wherein execution of the services are defined and controlled through Smart Contracts, with business rules collectively programmed to interoperate and support processing of MDM transactions in response to occurrence of a predetermined event or events, implemented by (a) a "chain code" invoked by a decentralized control system to direct the processing in contributing to a programmed system objective MDM, first according to algorithmic trust controls coordinating the work of peer nodes; and (b) second, according to a centralized control system comprising a controller configured to instruct components either directly or through a hierarchy of entities, to instruct a next lower-level node according to authoritative trust controls, thereby providing supervision for network interactions between nodes to establish oversight for MDM standard peer interactions, resolution of non-consensus peer-to-peer interactions, and approval of endorsed MDM transactions;

using an enterprise representational state transfer (REST) API engine and Blockchain query services to transfer a representation of the requested data asset's state to the requesting distributed application (dApp), executed via Batch automation or Online Interactive that is enhanced to real time.

8. The functions of the data computing platform of claim 1, wherein each node of the plurality of interconnected data processing nodes contains a storage management data layer responsible for:

defining a "single view" of the data as a Party Master, Account Master and Relationship Master authoritative sources, ensuring preprocessor standardization and normalization occur, and collecting the results of enhanced Master Data Registration and Certification processes;

maintaining Create, Retrieve, Update and Delete (CRUD) MDM Master Data contained within the documented transactions of a distributed ledger, and a primary operational world state data server set of Master Data representational state transfer (REST)ful data assets stored as immutable blocks on Blockchain;

using an enterprise grade Multi-Model database to store JavaScript Object Notation (JSON) format document files in establishing and controlling the Data Quality and Relational Integrity for those Core data assets, Extended and Super Extended data, and a coordinated History of Master Data transactions produced through the enhanced Blockchain distributed network of processing node resources, and wherein Master Data considered to be "In Motion," "In Processing" or "At Rest" will be protected by Blockchain cryptography and stored data encryption.

9. A strategic master data management (SMDM)—blockchain computing platform comprising a multiparty business network, the SMDM—blockchain computing platform comprising:

at least one processor;

a communication interface communicatively coupled to the at least one processor; and a memory operatively coupled to the processor and storing executable instructions, wherein the SMDM—blockchain computing platform is configured to:

perform collective virtual machine processing to generate virtual computing results to define a coordination protocol;

aggregate the virtual computing results as master data, wherein the master data comprises schema-defined data facilitating trust control across the multiparty business network to be incorporated in the coordination protocol; and implement the coordination protocol across the multiparty business network;

wherein performing the collective virtual machine processing includes executing one or more pods comprising processing environments and invoking one or more concurrent containers comprising application programs to dynamically scale computing resources; and wherein aggregating the virtual computing results as master data includes maintaining an immutable master ledger, wherein the immutable master ledger stores data asset records obtained from decentralized application transactions;

wherein a plurality of peer nodes further comprises an availability management network layer, wherein the availability management network layer is configured to perform a method comprising:

defining: (i) one or more distributed network processing node locations and (ii) network cluster locations comprising a local plurality of interconnected data processing nodes;

maintaining a distributed-ledger-technology, data-availability-node network comprising:

a distributed ledger; and a primary operational world state data server; and using enterprise message queue (MQ) interfaces and blockchain synchronized data to provide availability and localized access to the distributed network of processing node resources, wherein the distributed network of processing node resources is configured to be accessed using open and orchestrated communications that comprise two levels of trust control channel messaging, the two levels of trust control channel messaging comprising:

(a) a decentralized control system comprising some or all of the plurality of peer nodes, wherein the decentralized control system relies on distributed control depending on work of lower-level components operating on local information, wherein each component of the decentralized control system is equally responsible for contributing to a system objective by acting in the appropriate manner according to algorithmic trust controls to achieve consensus; and (b) a centralized control system comprising some or all of the plurality of peer nodes comprising a controller configured to instruct components either directly or through a hierarchy of entities, the components being instructed to further instruct a respective next lower-level node according to authoritative trust controls, thereby providing supervision for network interactions between multiple nodes of the plurality of peer nodes to establish oversight for peer interactions and approval of endorsed transactions, thereby applying governance.

10. The SMDM—blockchain computing platform of claim 9, wherein the multiparty business network is configured to be deployed as:

a peer-to-peer computing network comprising a plurality of interconnected data processing nodes, the plurality of interconnected data processing nodes providing computing power, wherein the peer-to-peer computing network is configured to:

support one or more pods, wherein the one or more pods comprise processing environments; and invoke one or more concurrent containers, the one or more concurrent containers comprising application programs, the invoking occurring as necessary to dynamically scale up to meet technical performance requirements associated with functionality, services, and data.

11. The SMDM—blockchain computing platform of claim 10, wherein the SMDM—blockchain computing platform is further configured to establish and maintain existence of the plurality of interconnected data processing nodes, and where the plurality of interconnected data processing nodes comprise:

an immutable master ledger or master ledger copy comprising logs and history, wherein the immutable master ledger or master ledger copy is configured to store data asset records in the master data, wherein the data asset records are obtained based on at least one of actively collecting the data asset records or passively deriving the data asset records, wherein the data asset records are obtained from decentralized application transactions;

an operational world state data server with current state results the data actively available, based upon certification of the master data, by query against the master data;

an application programming interface (API) configured to: (i) provide access to the services and the data, and (ii) facilitate construction and deployment of a custom user interface (UI) for transaction functionalities for SMDM blockchain, wherein the transaction functionalities for SMDM blockchain are selected from a group consisting of Create, Retrieve, Update and Delete operations; and multiple coordinated search capabilities to identify: (a) provenance of the data, (b) effective transactional progress of the data that comprises data history, and (c) a current world state in the SMDM blockchain.

12. The SMDM—blockchain computing platform of claim 10, wherein each node of the plurality of interconnected data processing nodes comprises four functional layers, the four functional layers including at least one of an access layer, a network layer, a service layer, and a data layer, each node of the plurality of interconnected data processing nodes being relative to its instantiated distributed ledger copy and operational world state data server.

13. The SMDM—blockchain computing platform of claim 10, wherein at least one node of the plurality of interconnected data processing nodes comprises a master node, the master node being configured to provide additional functional responsibilities relative to the other nodes of the plurality of interconnected data processing nodes, the master node comprising four functional layers, where the four functional layers include at least one of an access layer, a network layer, a service layer, or a data layer, the master node being relative to its instantiation of the master ledger and primary operational world state data server.

14. The SMDM—blockchain computing platform of claim 10, wherein the plurality of interconnected data processing nodes comprises a plurality of peer nodes each comprising an identity management access layer, wherein the identity management access layer is configured to perform a method comprising:

defining (a) role-based access control (RBAC) policies for access to the services, and (b) attribute-based access control (ABAC) time-based rules restricting access to portions of the data, the portions of the data comprising: (i) secure private data, and (ii) sensitive documents that are accepted and held with consent;

maintaining an authentication, authorization, and accounting (AAA) security framework that controls access to a distributed network of processing node resources, enforces policies, and audits usage; and using enterprise active directory user identifications (User IDs) and digital certificate authority (CA) certificates to identify and grant access to the distributed network of processing node resources in accordance with the policies.

15. The SMDM—blockchain computing platform of claim 14, wherein the plurality of peer nodes further comprises an asset management service layer, wherein the asset management service layer is configured to perform a method comprising:

defining a single view of the data from authoritative sources;

applying preprocessor standardization and normalization;

executing Registration and Certification processes;

maintaining a create, retrieve, update and delete (CRUD) MDM API framework comprising a distributed ledger and a primary operational world state data server set of services, wherein execution of the services are defined and controlled through smart contracts comprising business rules collectively programmed to interoperate and support processing of MDM transactions in response to occurrence of one or more predetermined events, the one or more predetermined events being implemented by:

a chain code invoked by the decentralized control system to direct the processing of the MDM transactions to contribute to a programmed system objective, wherein the chain code is invoked according to:

consensus-based algorithmic trust controls configured to coordinate the plurality of peer nodes; and authoritative trust controls configured to supervise network interactions between the plurality of peer nodes, the authoritative trust controls being used by a centralized control system comprising a controller that is configured to instruct components either directly or through a hierarchy of entities to further instruct a next lower-level node in accordance with the authoritative trust controls, thereby establishing governance and oversight for MDM standard peer interactions, resolution of non-consensus peer-to-peer interactions, and approval of endorsed MDM transactions; and using an enterprise representational state transfer (REST) API engine and blockchain query services to transfer a representation of a requested data asset's state to a requesting distributed application (dApp), the transfer being executed via batch automation that is enhanced to near-real time (NRT) or online interactive enhanced to real time (RT).

16. The SMDM—blockchain computing platform of claim 14, wherein the plurality of peer nodes comprises a storage management data layer, wherein the storage management data layer is configured to perform a method comprising:

defining a single view of the data as Party Master, Account Master and Relationship Master authoritative sources;

ensuring preprocessor standardization and normalization occur;

collecting the results of enhanced Master Data Registration and Certification processes;

maintaining Create, Retrieve, Update and Delete (CRUD) MDM master data, wherein documented transactions of a distributed ledger comprise the CRUD MDM master data;

maintaining a primary operational world state data server set of Master Data RESTful data assets stored as immutable blocks on blockchain; and using an enterprise grade multi-model database to store:

JavaScript Object Notation (JSON) format document files to establish and control data quality and relational integrity for core data assets;

extended and super extended data, and a coordinated history of master data transactions produced through the networked platform.

17. The SMDM—blockchain computing platform of claim 9, wherein the SMDM—blockchain computing platform is further configured to perform registration and certification of the master data, the registration and certification being defined and managed using distributed ledger technology comprising replicated, shared, and synchronized ledgers, the registration and certification facilitating establishing SMDM—blockchain computing functions.

* * * * *